(12) United States Patent
Nagano et al.

(10) Patent No.: US 6,563,308 B2
(45) Date of Patent: May 13, 2003

(54) EDDY CURRENT LOSS MEASURING SENSOR, THICKNESS MEASURING SYSTEM, THICKNESS MEASURING METHOD, AND RECORDED MEDIUM

(75) Inventors: Osamu Nagano, Yokohama (JP); Yuichiro Yamazaki, Tokyo-To (JP); Motosuke Miyoshi, Tokyo-Tu (JP); Hisashi Kaneko, Fujisawa (JP); Tetsuo Matsuda, Gunma-Ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/817,147

(22) Filed: Mar. 27, 2001

(65) Prior Publication Data

US 2003/0067298 A1 Apr. 10, 2003

(30) Foreign Application Priority Data

Mar. 28, 2000 (JP) ........................................ 2000-089356
Feb. 5, 2001 (JP) ........................................ 2001-028187

(51) Int. Cl.$^7$ ............................. H01L 21/66; G01B 7/06
(52) U.S. Cl. ....................... 324/230; 324/229; 324/238; 324/240
(58) Field of Search ................................ 324/229, 230, 324/240, 238; 702/38

(56) References Cited

U.S. PATENT DOCUMENTS 3,473,110 A * 10/1969 Hardin et al. ................ 324/236
4,553,095 A * 11/1985 Schenk, Jr. et al. ......... 324/230

(List continued on next page.)

FOREIGN PATENT DOCUMENTS

JP 2-218902 8/1990
JP 5-6641 1/1993
JP 8-285514 11/1996

OTHER PUBLICATIONS

Johnson et al., "Step Coverage Measurements Using A Non–Contact Sheet Resistance Probe," VMIC Conference (Jun. 10–12, 1997), pp. 198–199.

Johnson et al, "Non Contact Metal Film Sheet Resistance Measurements on Product Wafers," Proc. of SEMI Technology Symposium (1994).

(List continued on next page.)

Primary Examiner—Edward Lefkowitz
Assistant Examiner—Darrell Kinder
(74) Attorney, Agent, or Firm—Finnegan, Henderson, Farabow, Garrett & Dunner, L.L.P.

(57) ABSTRACT

A thickness measuring system comprises: an eddy current loss measuring sensor having an exciting coil for receiving a high frequency current to excite a high frequency magnetic field to excite an eddy current in a conductive film, and a receiving coil for outputting the high frequency current which is influenced by an eddy current loss caused by the eddy current; an impedance analyzer for measuring the variation in impedance of the eddy current loss measuring sensor, the variation in current value of the high frequency current or the variation in phase of the high frequency current on the basis of the high frequency current outputted from the receiving coil; an optical displacement sensor for measuring the distance between the conductive film and the eddy current loss measuring sensor; and a control computer including a thickness calculating part for calculating the thickness of the conductive film on the basis of various measured results of the impedance analyzer and optical displacement sensor, and the eddy current loss measuring sensor further has a ferrite member surrounding the exciting coil and the ferrite member has an opening in the bottom surface portion thereof for allowing the exciting coil to be exposed.

47 Claims, 23 Drawing Sheets

U.S. PATENT DOCUMENTS

| | | | | |
|---|---|---|---|---|
| 4,695,797 A | * | 9/1987 | Deutsch et al. | 324/230 |
| 4,977,853 A | * | 12/1990 | Falcoff et al. | 118/665 |
| 5,416,411 A | * | 5/1995 | Elsmore | 324/230 |
| 5,525,903 A | * | 6/1996 | Mandl et al. | 324/230 |
| 5,660,672 A | | 8/1997 | Li et al. | 156/345.13 |
| 5,731,697 A | | 3/1998 | Li et al. | 324/71.5 |
| 5,886,521 A | * | 3/1999 | Hassan | 324/227 |
| 6,040,694 A | * | 3/2000 | Becker | 324/230 |
| 6,072,313 A | | 6/2000 | Li et al. | 324/230 |
| 6,377,039 B1 | * | 4/2002 | Goldfine et al. | 324/232 |

OTHER PUBLICATIONS

Moulder et al., "Thickness and conductivity of metallic layers from eddy current measurements," American Institute of Physics (Jun. 1992), 63:3455–3465.

* cited by examiner

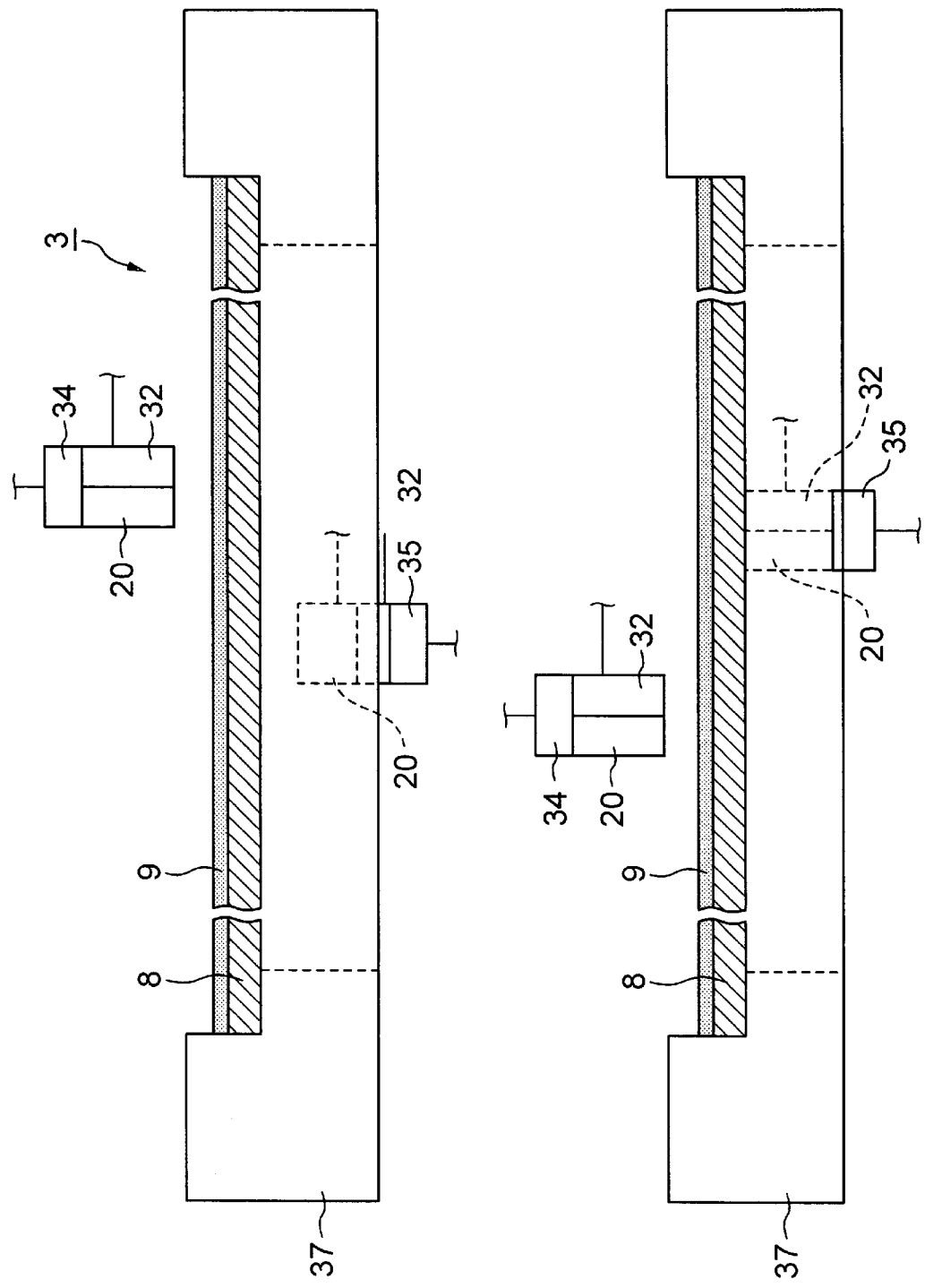

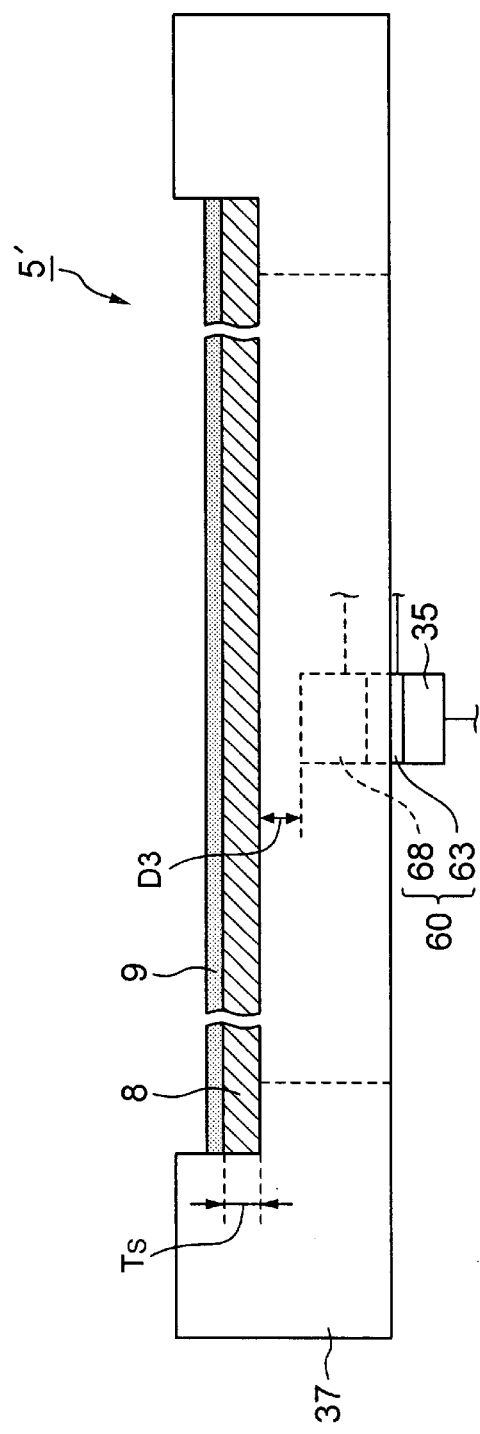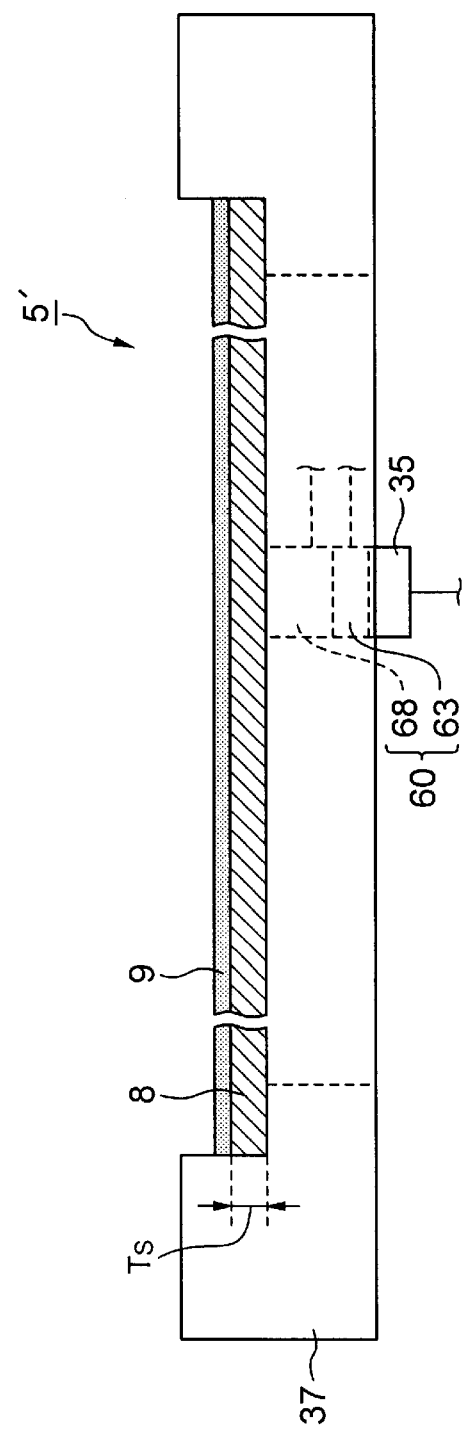
FIG. 18A
FIG. 18B

EDDY CURRENT LOSS MEASURING SENSOR, THICKNESS MEASURING SYSTEM, THICKNESS MEASURING METHOD, AND RECORDED MEDIUM

CROSS REFERENCE TO RELATED APPLICATION

This application claims benefit of priority under 35USC §119 to Japanese patent applications No. 2000-089356, filed on Mar. 28, 2000 and No. 2001-028187, filed on Feb. 5, 2001, the contents of which are incorporated by reference herein.

BACKGROUND OF THE INVENTION

1. Field of the Invention

The present invention relates generally to a system for measuring the thickness of a film. More specifically, the invention relates to an eddy current loss measuring sensor for measuring an eddy current loss due to an eddy current which is excited in a conductive film on the surface of a wafer by magnetizing a high frequency magnetic field, in a process for fabricating a semiconductor integrated circuit device, a thickness measuring system and method for non-contact-measuring the thickness of the conductive film on the basis of the measured eddy current loss, and a computer readable recorded medium in which a program for executing the method has been recorded.

2. Description of the Prior Art

A method for measuring the thickness of a conductive film using an eddy current is effective in a non-contact, non-destructive thickness measuring technique.

In a thickness measuring method using an eddy current, the distance between a coil (sensor) for generating a magnetic field and a conductive film has a great influence on the quantity of an eddy current loss in the conductive film. Therefore, it is important to precisely control the distance between the sensor and the conductive film.

FIG. 23 shows a data in an example of an experiment in which the quantity of an eddy current loss was measured as the variations in inductance and resistance of a sensor. It can also be understood from this figure that the inductance and resistance of the sensor vary in accordance with the distance between the sensor and the conductive film.

In order to reduce measurement errors due to such dependency on distance to improve measurement precision, the following techniques are proposed.

For example, as a first method, as shown in FIG. 23, there is a method for previously obtaining a correlation between the distance between a sensor and a conductive film and a measured value and for carrying out measurement at a plurality of points while varying the distance between the sensor and the conductive film, to carry out correction at the respective points of measurement using the above described correlation.

As a second method, as shown in FIG. 24, there is a method for measuring inductance Q by means of an impedance analyzer, when coils 103a and 103b for exciting an eddy current are provided on both sides of a conductive film serving as an object to be measured, so as to face each other via the conductive film, and connected in series.

However, according to the above described second measuring method, there is a disadvantage in that the system is complicated and large-scale.

In the first method for carrying out measurement at the plurality of points while varying the distance, the sensor or stage must be operated times of measurement, and a data processing must be every one of the points of measurement, so that it takes very much time to carry out the measurement. Therefore, there is a problem in that this method is of no practical use since it is unsuitable for a high-speed measurement, which is required in a mass production line, and for a real-time measurement in a thickness forming process.

On the other hand, as an attempt to localize a magnetic field, which is generated by a coil, at a point in order to enable to carry out a localized thickness measurement to improve measurement precision, there is only a method for inserting a core 110 of ferrite or a magnetic material into a coil 108 as shown in FIG. 25, in addition to a method for decreasing the diameter of the coil to enhance resolution.

As a sensor for measuring a displacement of a metal conductor, a sensor for localizing a magnetic field on a conductor is proposed. Referring to FIGS. 26A through 26D, an example thereof will be described below.

As shown in FIG. 26A, a displacement sensor comprises a receiving coil 112 wound onto a ferrite core 111, a high frequency exciting coil 113 wound onto the outside of the receiving coil 112, and an outer screening plate 114 of copper which is provided so as to cover the ferrite core 111 and the coils 112 and 113, and the top of which is open.

The high frequency exciting coil 113 is designed to receive a high frequency current to generate a magnetic field to excite an eddy current to a metal conductor C serving as an object to be measured. The receiving coil 112 is designed to receive a magnetic field having a magnetic flux density which is reduced by the eddy current produced by the metal conductor C.

The outer screening plate 114 comprises semi-cylindrical portions 114a and 114b which are arranged so as to face each other. Typically as shown in FIG. 26B, the semi-cylindrical portions have semi-circular bottom plate half-portions 114c and 114d, respectively. The right and left semi-cylindrical portions 114a and 114b are arranged so as to face each other via a minute clearance to form a radially extending insulating slit 115 between the bottom plate half-portions 114c and 114d as shown in the bottom drawing of FIG. 26C. Thus, the outer screening plate 114 comprises the right and left semi-cylindrical portions which are separated from each other by the insulating slit 115 to be insulated from each other. While the linear insulating slit has been described in this embodiment, a cross insulating slit may be formed.

If a high frequency exciting current is passed through the high frequency exciting coil 113, a high frequency magnetic field is produced to induce an eddy current in the right and left bottom plate half-portions 114c and 114d of the outer screening plate 114. Since this eddy current is generated in a direction in which the magnetic field is interrupted, a synthetic magnetic field of the magnetic field due to the exciting coil 113 and the magnetic field due to the eddy current in the respective bottom plate half-portions 114c and 114d has a small magnetic flux density in the respective bottom plate half-portions 114c and 114d, and a large magnetic flux density in the insulating slit 115. For that reason, as shown in FIG. 25D, an uneven high frequency magnetic field having a magnetic flux density of a maximum value Bmax in an insulating slit portion S0 is formed in a sensor head. Therefore, when the sensor head is arranged above the metal conductor C of a copper wire or the like as shown in FIG. 26A, if the conductor C is arranged directly below the insulating slit 115 of the outer screening plate 114, the electric flux density in a space occupied by the conductor C is maximum, and the screening effect of the outer screening plate 114 is weakest with respect to the alternating magnetic field induced by the eddy current of the conductor C. At this time, the influence of the conductor C on impedance of the receiving coil 112 of the sensor head is maximum.

Thus, the structure in which the linear or cross slit causes the magnetic flux to extend into the longitudinal region is effective in the examination of the displacement of an elongated body of a metal conductor or the like. However, this structure is insufficient for a localized thickness measurement since it is required to form a magnetic field serving as a stop.

SUMMARY OF THE INVENTION

It is therefore an object of the present invention to eliminate the aforementioned problems and to provide an eddy current loss measuring sensor capable of carrying out a localized thickness measurement, a thickness measuring system and method for rapidly and precisely measuring the thickness of a film, and a computer readable recorded medium in which a program for executing the method has been recorded.

According to a first aspect of the present invention, there is provided an eddy current loss measuring sensor comprising: an exciting/receiving coil for receiving a high frequency current to excite a high frequency magnetic field to excite an eddy current in a conductive film which is an object to be measured, and for receiving a synthetic magnetic field of a magnetic field generated by the eddy current and the high frequency magnetic field; a first magnetic permeable member inserted into the exciting/receiving coil to serve as a core, the first magnetic permeable member being formed of a first magnetic permeable material; and a second magnetic permeable member provided so as to surround the first permeable member and the exciting/receiving coil, the second magnetic permeable member being formed of a second magnetic permeable material and having a surface facing the conductive film, the surface having an opening so that a region of at least a part of the exciting/receiving coil is exposed.

The magnetic flux generated by an exciting/receiving coil form a magnetic circuit wherein the magnetic flux leaks out only from an opening to the outside via a first magnetic permeable member to draw a curve to return to the first magnetic permeable member via a second magnetic permeable member. The second magnetic permeable member prevents the magnetic flux from leaking out to the outside of the sensor. Thus, the curve can be sharp. Therefore, if an eddy current loss measuring sensor is arranged in the vicinity of a conductive film so as to face the conductive film so that the vertex of the curve is arranged in the conductive film, it is possible to excite an eddy current only in a very small region. Thus, it is possible to measure the quantity of an eddy current loss in a localized region, so that there is provided a high-accuracy eddy current loss measuring sensor which does not destroy an object to be measured and which does not prevent a process for depositing, etching or polishing a conductive film.

According to a second aspect of the invention, there is provided an eddy current loss measuring sensor comprising: an eddy current exciting coil for receiving a high frequency current to excite a high frequency magnetic field to excite an eddy current in a conductive film serving as an object to be measured; a receiving coil, provided so as to be wound by the eddy current exciting coil in the eddy current exciting coil, for receiving a synthetic magnetic field of a magnetic field generated by the eddy current and the high frequency magnetic field; a first magnetic permeable member inserted into the receiving coil to serve as a core; and a second magnetic permeable member provided so as to surround the first permeable member, the receiving coil and the eddy current exciting coil, the first magnetic permeable member being formed of a first magnetic permeable material, the second magnetic permeable member being formed of a second magnetic permeable material, and the second magnetic permeable member having a surface facing the conductive film, the surface having an opening so that a region of at least a part of the receiving coil is exposed.

If an eddy current exciting coil and a receiving coil are thus provided, there is provided an eddy current loss measuring sensor having a more excellent resolution.

The distance between the opening and the first magnetic permeable member may be adjusted so that a magnetic flux only leaks into a localized region of the conductive film.

In the above mentioned eddy current loss measuring sensor, the surface portion of the opening, or the surface portion of the opening and the surface portion of a region near the opening may advantageously be formed of a third magnetic permeable material having a higher magnetic permeability than that of the second magnetic permeable material. Thus, the magnetic flux leaking out of the opening can be localized in a further localized region.

The first through third magnetic permeable materials may preferably include an electric insulating material. This electric insulating material preferably includes ferrite.

According to a third aspect of the invention, there is provided a thickness measuring system comprising: an eddy current loss measuring sensor for receiving a high frequency current to excite a high frequency magnetic field to excite an eddy current in a conductive film serving as an object to be measured, and for outputting the high frequency current which is influenced by an eddy current loss caused by the eddy current; an eddy current loss measuring part for detecting the high frequency current, which is outputted from the eddy current loss measuring sensor, to measure the variation in impedance of the eddy current loss measuring sensor, the variation in current value of the high frequency current or the variation in phase of the high frequency current to output the measured variation as data indicative of the magnitude of the eddy current loss; a distance measuring part for measuring the distance between the conductive film and the eddy current loss measuring sensor; and a thickness operation part for calculating the thickness of the conductive film on the basis of the measured result of the eddy current loss measuring part and the measured result of the distance measuring part.

The distance measuring part measures the distance between the conductive film and the eddy current loss measuring sensor, and the thickness operation part calculates the thickness of the conductive film on the basis of the measured distance and the variation in impedance of the eddy current loss measuring sensor, the variation in current value of the high frequency current or the variation in phase of the high frequency current. Thus, it is possible to reduce measurement errors depending on the distance, so that there is provided a noncontact, non-destructive thickness measuring system capable of precisely measuring the thickness.

The frequency of the high frequency current is preferably in the range from approximately 1 MHz through approximately 10 MHz.

In the above-mentioned thickness measuring system, the eddy current loss measuring sensor may preferably comprise: an exciting/receiving coil for receiving the high frequency current to excite a high frequency magnetic field to excite an eddy current in a conductive film which is an object to be measured, and for receiving a synthetic magnetic field of a magnetic field generated by the eddy current and the high frequency magnetic field, to output the high frequency current which is influenced by an eddy current loss caused by the eddy current; a first magnetic permeable member inserted into the exciting/receiving coil to serve as a core, the first magnetic permeable member being formed of a first magnetic permeable material; and a second magnetic permeable member provided so as to surround the first permeable member and the exciting/receiving coil, the second magnetic permeable member being formed of a second magnetic permeable material.

Alternatively, in the above-mentioned thickness measuring system, the eddy current loss measuring sensor may comprise:

an eddy current exciting coil for receiving the high frequency current to excite a high frequency magnetic field to excite an eddy current in a conductive film serving as an object to be measured; a receiving coil, provided so as to be wound by the eddy current exciting coil in the eddy current exciting coil, for receiving a synthetic magnetic field of a magnetic field generated by the eddy current and the high frequency magnetic field, to output the high frequency current which is influenced by an eddy current loss caused by the eddy current; a first magnetic permeable member inserted into the receiving coil to serve as a core; and a second magnetic permeable member provided so as to surround the first permeable member, the receiving coil and the eddy current exciting coil, the first magnetic permeable member being formed of a first magnetic permeable material, and the second magnetic permeable member being formed of a second magnetic permeable material.

The second magnetic permeable member may preferably have a surface facing the conductive film, the surface having an opening so that a region of at least a part of the exciting/receiving coil or the receiving coil is exposed.

If the opening is formed in the second magnetic permeable member, it is possible to locally measure the thickness of the conductive film. Thus, even in the case of a conductive film having a great dispersion of thickness, such as a conductive film formed on a substrate on which a pattern has been formed, it is possible to precisely measure the thickness of the conductive film. This is particularly advantageous to the monitoring of the thickness in parallel to a deposition process. In addition, it is possible to manage the thickness in various systems, such as CMP and plating systems.

The distance between the opening and the first magnetic permeable member may preferably be adjusted so that a magnetic flux only leaks into a localized region of the conductive film.

Furthermore, the surface portion of the opening, or the surface portion of the opening and the surface portion of a region near the opening may advantageously be formed of a third magnetic permeable material having a higher magnetic permeability that that of the second magnetic permeable material. Thus, the magnetic flux leaking out of the opening can be localized in a further localized region.

In the eddy current loss measuring sensor of the thickness measuring system, the first through third magnetic permeable materials preferably include an electric insulating material. This electric insulating material preferably includes ferrite.

The thickness measuring system may preferably further comprise: a memory for storing therein a measuring data indicative of a correlation between the distance between the eddy current loss measuring sensor and the conductive film, the frequency of the high frequency current, the thickness of the conductive film, the specific resistance of the conductive film, and the variation in impedance of the eddy current loss measuring sensor, or a correlation between the distance, the frequency, the thickness and the specific resistance, and the variation in current value of the high frequency current, or a correlation between the distance, the frequency, the thickness, the specific resistance, and the variation in phase of the high frequency current, wherein the thickness operation part calculates the thickness of the conductive film by comparing the measured variation in impedance of the eddy current loss measuring sensor, the measured variation in current value of the high frequency current or the measured variation in phase of the high frequency current with the measuring data.

The thickness measuring system may advantageously further comprises: a stage for supporting thereon a substrate on which the conductive film is deposited; and a control part for controlling a relative positional relationship between the stage and the eddy current loss measuring sensor on the basis of the measured result of the distance measuring part.

Using the control part, it is possible to hold a substantially constant distance between the stage and the eddy current loss measuring sensor on the basis of the measured results of the distance measuring system.

It is preferable that the control part moves the eddy current loss measuring sensor to a region which is not influenced by the eddy current, prior to the excitation of the eddy current into the conductive film, the eddy current loss measuring part measures the impedance of the eddy current measuring sensor, the current value of the high frequency current or the phase of the high frequency current, which are measured in the region which is not influenced by the eddy current, as a measuring reference value; and the thickness operation part corrects the calculated thickness value on the basis of the measuring reference value.

If a correction process is carried out, it is possible to suitably correct measurement errors due to external or internal factors.

In the thickness measuring system, a reference conductive film serving as a reference of measurement may be previously prepared in the region which is not influenced by the eddy current, the control part may move the eddy current loss measuring sensor to the region in which the reference conductive film has been prepared, prior to the excitation of the eddy current into the conductive film serving as the object to be measured, and the eddy current loss measuring part may measure the eddy current loss using the impedance of an eddy current loss measuring sensor, the current value of the high frequency current or the phase of the high frequency current, which are measured in the region in which the reference conductive film has been formed, as a measurement reference value.

It is preferable that the reference conductive film may be a plurality of the reference conductive film each of which is formed of conductive material having conductivity different from each other and formed in thickness different from each other, the eddy current loss measuring part may measure a plurality of the measurement reference values, and the thickness operation part may correct the calculated thickness on the basis of the plurality of the measurement reference values.

It is preferable that the thickness measuring system further comprises; stage moving part for moving the stage; and a sensor moving part for moving the eddy current loss measuring sensor, wherein the control part controls the stage moving part and the sensor moving part so that the eddy current loss measuring sensor scans on the conductive film while holding a substantially constant distance between the eddy current loss measuring sensor and the conductive film, in parallel to a deposition, etching or polishing process for the conductive film.

If the control part cause the eddy current loss measuring sensor to scan, it is possible to rapidly measure the thickness.

The thickness measuring system may further comprises a stage moving part for moving the stage and a sensor moving part for moving the eddy current loss measuring sensor, and the control part may control the stage moving part so that the eddy current loss measuring sensor scans on the conductive film in parallel to a deposition, etching or polishing process for the conductive film, and the thickness operation part may receive the measured result of the distance measuring part to correct the calculated thickness value.

If the calculated thickness value is corrected on the basis of the measured results of the distance measuring part, it is not required to hold the constant distance during measurement. Thus, the eddy current loss measuring sensor can rapidly scan on the conductive film in parallel to the deposition process.

The eddy current loss measuring sensor may include an exciting/receiving air-cored coil for receiving the high frequency current to excite a high frequency magnetic field to excite an eddy current in a conductive film which is an object to be measured, and for receiving a synthetic magnetic field of a magnetic field generated by the eddy current and the high frequency magnetic field, to output the high frequency current which is influenced by an eddy current loss caused by the eddy current, and the distance measuring part may include a laser displacement sensor provided above the air-cored coil for emitting a laser beam to cause the laser beam to be incident on the surface of the conductive film via an air-core of the air-cored coil and for receiving light via the air-core, the light being reflected on the conductive film.

Alternatively, the eddy current loss measuring sensor may include an eddy current exciting coil for receiving the high frequency current to excite a high frequency magnetic field to excite an eddy current in a conductive film which is an object to be measured, and an air-coiled receiving coil, provided so as to be wound by the eddy current exciting coil in the eddy current exciting coil, for receiving a synthetic magnetic field of a magnetic field generated by the eddy current and the high frequency magnetic field, to output the high frequency current which is influenced by an eddy current loss caused by the eddy current, and the distance measuring part may include a laser displacement sensor which is provided above the receiving coil for emitting a laser beam to cause the laser beam to be incident on the surface of the conductive film via an air-core of the receiving coil and for receiving light via the air-core, the light being reflected on the conductive film.

The laser displacement sensor causes the surface of the conductive film to be irradiated with laser beams via the air-core of the air-cored coil or of the receiving coil, and receives the reflected light via the air-core, so that the intersection between the center line of the air-core and the surface of the conductive film, or a region near the intersection is irradiated with the laser beams. Therefore, the distance between the eddy current loss measuring sensor and the conductive film can be directly measured. Thus, the measurement of the distance and the measurement of the eddy current loss can be simultaneously carried out in parallel.

The thickness measuring system may further comprise a distance measurement error correcting part for driving the laser displacement sensor to measure the distance prior to the measurement of the thickness of the conductive film, and for correcting a measurement error of the measured result, and the control part may control the stage moving part and the sensor moving part on the basis of the measured distance, which is corrected by the distance measurement error correcting part, so that the eddy current loss measuring sensor scans on the conductive film while holding a substantially constant distance between the eddy current loss measuring sensor and the conductive film. Alternatively, in place of the fact that the eddy current loss measuring sensor scans on the conductive film while holding a substantially constant distance between the eddy current loss measuring sensor and the conductive film, the thickness operation part may correct the calculated thickness value on the basis of the measured distance corrected by the distance measurement error correcting part.

Since the distance measurement error correcting part corrects the measurement errors of the distance before the thickness is measured, the distance measurement precision can also be improved with a small number of measuring points with respect to a conductive film which is formed on an LSI pattern to have a great variation in reflectance and/or which has a great roughness.

In the above mentioned thickness measuring system it is advantageous that the distance measuring part may include a capacitance type displacement sensor having an electrode provided in the vicinity of the eddy current loss measuring sensor for measuring the distance on the basis of an electrostatic capacity between the electrode and the conductive film.

Since the capacitance displacement sensor is not influenced by the reflectance of light and/or roughness on the surface of the conductive film, the distance measuring part can precisely measure the distance between the eddy current loss measuring sensor and the conductive film. In this case, the potential of the conductive film is held at the ground potential. This is realized by grounding a side of a substrate on which the conductive film is formed or by grounding the top surface or the reverse surface of a region, which has no influence on the measurement of the thickness, of the region of the conductive film.

The measuring electrode may preferably be provided so that the bottom face of the measuring electrode is substantially arranged on the same plane of the bottom face of the eddy current loss measuring sensor. Thus, it is possible to directly measure the above described distance.

In addition, the measuring electrode may preferably be a thin film electrode made of a high resistance material. Thus, it is possible to reduce the possibility of generating an eddy current in the measuring electrode itself.

Moreover, if the measuring electrode comprises a plurality of electrode pieces, it is possible to further reduce the possibility of generating an eddy current in the measuring electrode itself.

Furthermore, it is advantageous that the measuring electrode may have a ring shape surrounding the eddy current loss measuring sensor, the external diameter thereof may be substantially the same as the diameter of a region in which an eddy current loss is generated by the eddy current excited in the conductive film by the eddy current loss measuring sensor, and the internal diameter thereof may be selected so that the eddy current excited in the measuring electrode by the eddy current loss measuring sensor is small so as to be capable of being ignored in measurement and so that the measuring electrode has a surface area so as to be capable of measuring the electrostatic capacity between the measuring electrode and the conductive film. Thus, it is possible to further avoid generating the eddy current.

In the thickness measuring system, the stage may preferably be formed of an insulating material or a material having conductivity so that only a small quantity of eddy current capable of being ignored is generated in measurement, even in receiving the high frequency magnetic field. Thus, since the eddy current loss generated in the stage is greatly suppressed, it is possible to further enhance the measurement precision.

The thickness measuring system may advantageously further comprises a frequency control part for controlling the frequency of the high frequency current so that the high frequency current has a frequency according to the thickness of the conductive film.

The permeating depth of an eddy current into the conductive film varies in accordance with the frequency of a magnetic field exciting the eddy current. Therefore, if the frequency of the high frequency current is flexibly adjusted in accordance with the estimated value of the thickness of the conductive film, it is possible to enhance the resolution of the system.

In addition, if the thickness measuring system is used in parallel to a deposition process for the conductive film, the frequency of the high frequency current can appropriately be adjusted in accordance with a variation of the thickness. Thus, it is possible to more rapidly scan on the surface of the substrate, and it is possible to precisely monitor the thickness in real time.

If the conductive film is deposited above a circuit pattern including a conductive material or an underlying conductive film, the thickness operation part of the thickness measuring system may previously calculate a thickness value of the circuit pattern or the underlying conductive film as an underlayer thickness value, a total thickness value of the underlayer thickness value and the thickness value of the conductive film during or after the deposition of the conductive film, and substrate the underlayer thickness value from the calculated total thickness value.

Thus, since a previously calculated underlayer thickness value is subtracted from a total thickness value, even if the conductive film serving as an object to be measured is deposited above a circuit pattern or an underlying conductive film, it is possible to precisely measure only the thickness values.

The above mentioned thickness measuring system may further comprise a plurality of the eddy current loss measuring sensors.

If a plurality of eddy current loss measuring sensors are simultaneously controlled to scan on the surface of the conductive film on the substrate, it is possible to rapidly measure the thickness distribution.

In the thickness measuring system, the eddy current loss measuring sensor may be provided so as to face a surface on which the conductive film serving as the object to be measured is deposited, etched or polished, or so as to face a substrate surface on the opposite side to a surface on which the conductive film serving as the object to be measured is deposited, etched or polished, or so as to face both of a surface on which the conductive film serving as the object to be measured is deposited and a substrate surface on the opposite side to the surface on which the conductive film serving as the object to be measured is deposited, etched or polished.

If the eddy current loss measuring sensor is provided so as to face a substrate surface on the opposite side to a surface on which the conductive film serving as an object to be measured is deposited, etched or polished, it is possible to eliminate the possibility of preventing the deposition, etching or polishing of the conductive film serving as the object to be measured, in the deposition, etching or polishing process, and it is possible to measure the thickness while the eddy current loss measuring sensor contacts the substrate surface. Moreover, it is not required to scan while avoiding contacting a polishing tool in the CMP process. Thus, there is provided a thickness measuring system which can greatly reduce constraints on measurement and which has excellent degree of freedom of design and throughput in measurement.

According to a fourth aspect of the present invention, there is provided a thickness measuring method using a thickness measuring system having an eddy current loss measuring sensor for exciting a high frequency magnetic field to excite an eddy current in a conductive film, which is an object to be measured, and for detecting an eddy current loss caused by the eddy current, and a distance measuring part, the method comprising: a distance measuring step of measuring the distance between the eddy current loss measuring sensor and the conductive film by means of the distance measuring part; an eddy current loss measuring step of supplying a high frequency current to the eddy current loss measuring sensor to excite the high frequency magnetic field to excite an eddy current in the conductive film to measure the variation in impedance of the eddy current loss measuring sensor, the variation in current value of the high frequency current or the variation in phase of the high frequency current on the basis of the high frequency current outputted from the eddy current loss measuring sensor; and a thickness calculating step of calculating the thickness of the conductive film on the basis of the variation in impedance and the distance between the eddy current loss measuring sensor and the conductive film, or the variation in current value of the high frequency current and the distance between the eddy current loss measuring sensor and the conductive film, or the variation in phase of the high frequency current and the distance between the eddy current loss measuring sensor and the conductive film.

According to the thickness measuring method, the thickness of the conductive film is calculated on the basis of the variation in impedance and the distance between the eddy current loss measuring sensor and the conductive film, or the variation in current value of the high frequency current and the distance between the eddy current loss measuring sensor and the conductive film, or the variation in phase of the high frequency current and the distance between the eddy current loss measuring sensor and the conductive film, so that it is possible realize a non-contact, non-destructive, precise thickness measurement.

The thickness calculating step may includes: a first calculating step of calculating the thickness of the conductive film on the basis of the variation in impedance of the eddy current loss measuring sensor, the variation in current value of the high frequency current or the variation in phase of the high frequency current; and a first correcting step of correcting the thickness value, the thickness value being obtained at the first calculating step, on the basis of the relationship between the distance and the impedance, or the relationship between the distance and the current value of the high frequency current, or the relationship between the distance and the phase of the high frequency current.

It is preferable that the distance measuring part includes an optical displacement sensor and the thickness measuring system further comprises a distance measurement error correcting step of driving the optical displacement sensor to measure the distance prior to the measurement of the thickness of the conductive film and of correcting a measurement error of the measure result, the thickness calculating step including a step of correcting the calculated thickness value on the basis of the measured distance corrected at the distance measurement error correcting step.

Since a distance measurement error correcting step is further provided, it is also possible to improve the distance measurement precision with a small number of measuring points with respect to a conductive film which is formed on an LSI pattern to have a great variation in reflectance and/or a conductive film which has a great roughness on the surface.

It is advantageous that if the eddy current measuring sensor includes an air-cored coil, and distance measuring part includes a laser displacement laser, provided above the air-cored coil, for emitting a laser beam to cause the laser beam to be incident on the surface of the conductive film via an air-core of the air-cored coil and for receiving light via the air-core, the light being reflected on the surface of the conductive film, the distance measuring step and the eddy current loss measuring step are simultaneously carried out in parallel.

The laser displacement sensor causes the surface of the conductive film to be irradiated with laser beams via the air-core of the air-cored coil, and receives the reflected light via the air-core, so that the intersection between the center line of the air-core and the surface of the conductive film, or a region near the intersection is irradiated with the laser beams. Therefore, the distance between the eddy current loss measuring sensor and the conductive film can be directly measured. Thus, it is possible to enhance the distance measurement precision.

In addition, since the distance measuring step and the eddy current loss measuring step are simultaneously carried out in parallel, it is possible to greatly improve the throughput in the measurement of the thickness.

In the thickness measuring method of the present invention, it is preferable that if the distance measuring part of the thickness measuring system includes a capacitance type displacement sensor having a measuring electrode provided in the vicinity of the eddy current loss measuring sensor for measuring the distance on the basis of an electrostatic capacity between the measuring electrode and the conductive film, the distance measuring step and the eddy current loss measuring step are simultaneously carried out in parallel.

According to the measuring method, the capacitance displacement sensor which is not influenced by the reflectance of light and roughness on the surface of the conductive film is used, so that it is possible to precisely measure the above described distance.

The thickness measuring method may further comprise a reference value measuring step of, prior to the eddy current loss measuring step, supplying the high frequency current to the eddy current loss measuring sensor in a region which is not influenced by the eddy current loss and of measuring an impedance of the eddy current loss measuring sensor, a current value of the high frequency current or a phase of the high frequency current on the basis of the high frequency current outputted from the eddy current loss measuring sensor as a measuring reference value, and the thickness calculating step including a second correcting step of correcting the value of the thickness on the basis of the measuring reference value, the value of the thickness being obtained at the first calculating step.

A reference value measuring step for obtaining a measurement reference value in a region which is not influenced by the eddy current loss is further provided, and the thickness measuring step includes a first correcting step of correcting the calculated thickness value on the basis of the measurement reference, so that it is possible to prevent the drift of the measured value due to the fluctuation of the system and so fourth.

When a reference conductive film is previously prepared in the region which is not influenced by the eddy current, the reference conductive film serving as a reference of measurement and having a predetermined thickness, the reference value measuring step may preferably be a step of measuring the impedance of the eddy current loss measuring sensor, the current value of the high frequency current or the phase of the high frequency current as the measuring reference value, the impedance, the current value and the phase being measured in a region in which the reference conductive film is deposited.

Furthermore, if a plurality of the reference conductive film are previously prepared and if each of the reference conductive film are formed of conductive material having conductivity different from each other and formed in thickness different from each other, the reference value measuring step may be a step of measuring a plurality of the measurement reference values.

If the thickness measuring system further comprises a stage for supporting thereon a substrate on which the conductive film is deposited, the eddy current loss measuring step may preferably include a step of controlling a relative positional relationship between the stage and the eddy current loss measuring sensor so that the distance is substantially constant on the basis of the measured result at the distance measuring step. In addition, in place of the step of controlling a relative positional relationship so that the distance is substantially constant, the thickness measuring step may further include a second correcting step of correcting the thickness value, which is obtained at the first calculating step, on the basis of the relationship between the distance and the impedance, the relationship between the distance and the current value of the high frequency current or the relationship between the distance and the phase of the high frequency current.

If the thickness measuring system is used to a depositing process, an etching process or a polishing process for the conductivity film, it is advantageous that the thickness measuring method may advantageously be carried out in parallel to the deposition, etching or polishing step of the conductive film.

In addition, if the thickness measuring system is used to a process for a deposition, etching or polishing of the conductive film, the thickness measuring method may preferably comprise a step of controlling the frequency of the high frequency current.

Furthermore, if the conductive film is deposited above a circuit pattern including a conductive material or an underlying conductive film, the thickness measuring method may preferably include a step of previously calculating a thickness value of the circuit pattern or the underlying conductive film as an underlayer thickness value, a step of calculating a total thickness value of the underlayer thickness value and the thickness value of the conductive film during or after the deposition of the conductive film, and a step of subtracting the underlayer thickness value from the calculated total thickness value.

According to a fifth aspect of the present invention, there is provided a computer readable recorded medium for use in a thickness measuring system comprising an eddy current loss measuring sensor for exciting a high frequency magnetic field to excite an eddy current in a conductive film which is an object to be measured and for detecting an eddy current loss caused by the eddy current, a distance measuring part and a computer, the computer readable recorded medium including a program recorded therein for causing the computer to execute a thickness measuring method comprising: a distance measuring step of measuring the distance between the eddy current loss measuring sensor and the conductive film by means of the distance measuring part; an eddy current exciting step of supplying a high frequency current to the eddy current loss measuring sensor to excite the high frequency magnetic field to excite an eddy current in the conductive film; an eddy current loss measuring step of measuring the variation in impedance of the eddy current loss measuring sensor, the variation in current value of the high frequency current or the variation in phase of the high frequency current on the basis of the high frequency current outputted from the eddy current loss measuring sensor; and a thickness calculating step of calculating the thickness of the conductive film on the basis of the variation in impedance and the distance between the eddy current loss measuring sensor and the conductive film, or the variation in current value of the high frequency current and the distance between the eddy current loss measuring sensor and the conductive film, or the variation in phase of the high frequency current and the distance between the eddy current loss measuring sensor and the conductive film.

According to the fifth aspect of the present invention, it is possible to precisely and rapidly measure the conductive film using a thickness measuring system comprising an eddy current measuring sensor, a distance measuring part and a general purpose computer.

In the above mentioned thickness measuring method, it is advantageous that the distance measuring step and the eddy current loss measuring step may be simultaneously carried out in parallel.

The thickness calculating step of the thickness measuring method may preferably include: a first calculating step of calculating the thickness of the conductive film on the basis of the variation in impedance of the eddy current loss measuring sensor, the variation in current value of the high frequency current or the variation in phase of the high frequency current; and a first correcting step of correcting the thickness value, the thickness value being obtained in the first calculating step, on the basis of the relationship between the distance and the impedance, or the relationship between the distance and the current value of the high frequency current, or the relationship between the distance and the phase of the high frequency current.

Furthermore, the thickness measuring method may preferably further comprise a distance measurement error correcting step of measuring the distance prior to the measurement of the thickness of the conductive film and of correcting a measurement error of the measured result, and the thickness calculating step includes a second correcting step of correcting the calculated thickness value on the basis of the measured distance corrected in the distance measurement error correcting step.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings:

FIGS. 13A and 13B are schematic diagrams showing a principal part of the fourth preferred embodiment of a thickness measuring system according to the present invention;

FIGS. 18A and 18B are schematic diagrams showing a principal part of the seventh preferred embodiment of a thickness measuring system according to the present invention;

DESCRIPTION OF THE PREFERRED EMBODIMENTS

Referring now to the accompanying drawings, some preferred embodiments of the present invention will be described below. Furthermore, the same reference numbers are given to the same portions in the following drawings, and the descriptions thereof are appropriately omitted.

(1) Preferred Embodiments Of Eddy Current Loss Measuring Sensor

First, some preferred embodiments of an eddy current loss measuring sensor according to the present invention will be described below.

(a) First Preferred Embodiment Of Eddy Current Loss Measuring Sensor

Figure 1A:
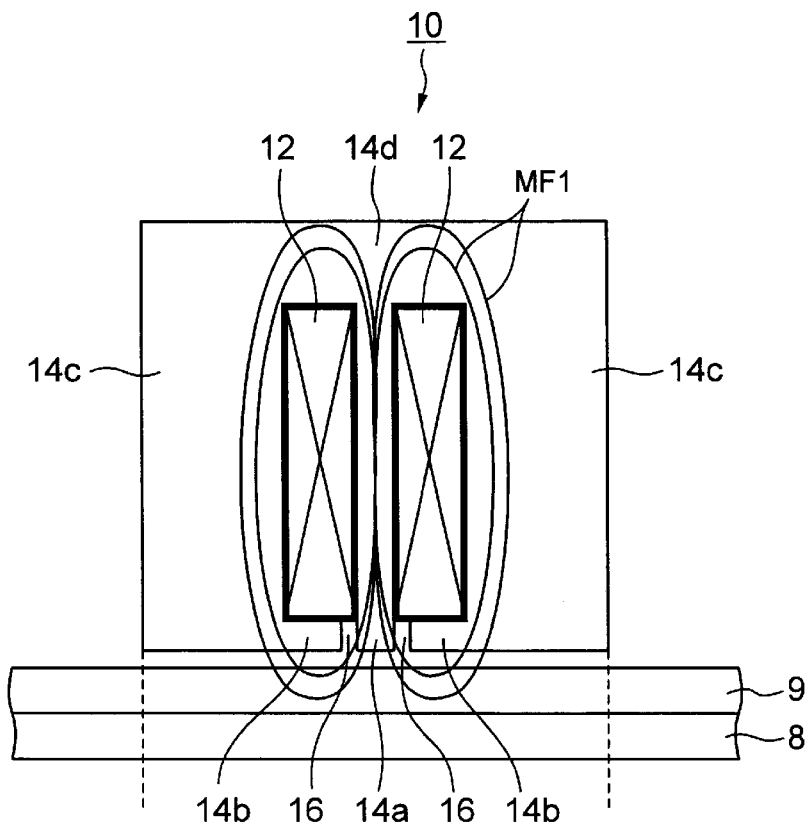
FIGS. 1A and 1B are sectional and bottom views schematically showing the construction of the first preferred embodiment of an eddy current loss measuring sensor according to the present invention.
Figure 1B:
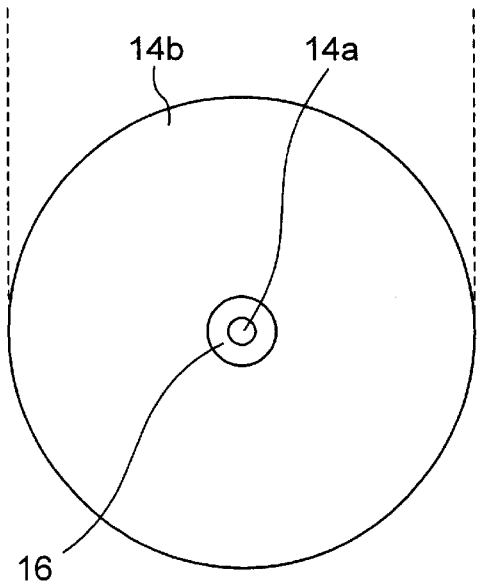

FIG. 1A is a schematic sectional view showing the first preferred embodiment of an eddy current loss measuring sensor according to the present invention, and FIG. 1B is a bottom view thereof.

As shown in FIG. 1A, the eddy current loss measuring sensor 10 in this preferred embodiment comprises a cylindrical coil 12, a ferrite core (first magnetic permeable member) 14a inserted into the coil 12, and ferrite members (second magnetic permeable members) 14b through 14d provided so as to surround the coil 12 and the ferrite core 14a.

The coil 12 is an exciting/receiving coil for receiving a high frequency current from a high frequency power supply (not shown) to form a magnetic field and for receiving a magnetic field which is generated by an eddy current excited in a conductive film 9 serving as an object to be measured.

Each of the ferrite cores 14a forming a central axis and the peripheral ferrite members 14b through 14d has a relatively high relative magnetic permeability of, e.g., 400.

The feature of the eddy current loss measuring sensor in this preferred embodiment is that an opening 16 is formed in the ferrite member 14b of the ferrite members 14, which is arranged on the bottom face which faces the conductive film 9. Also as shown in FIG. 1B, the opening 16 is formed in the ferrite member 14b so as to form a ring-shaped recessed portion around the ferrite core 14a, and the bottom face of the coil 12 is exposed to the bottom face of the recessed portion. The surface of the opening 16 and a portion of the surface region of the ferrite members 14a and 14b in the vicinity of the opening 16 are plated with a material 15 having a higher magnetic permeability than those of the materials of the ferrite members 14a and 14b. Thus, a magnetic flux MF1 can be localized to leak out only in a localized region.

The operation of the eddy current loss measuring sensor 10 shown in FIGS. 1A and 1B will be described below.

If a high frequency current is supplied to the coil 12, there is formed a magnetic circuit wherein lines of magnetic flux MF1 generated by the coil 12 pass through the central axis of the ferrite core 14a to reach the opening 16 to leak out only from the opening 16 to the outside, to return into the ferrite member 14b so as to draw a sharp parabola having a vertex below the coil 12, to return to the central axis of the ferrite core 14a again via the side ferrite member 14c and the top ferrite member 14d. Therefore, the distribution of the magnetic field in the lateral directions of the eddy current loss measuring sensor 20 can be very small. In addition, the ring-shaped opening 16 is formed in the central region of the bottom ferrite material 14b, and the outer peripheral surface of the opening 16 and the surface region of the ferrite member 14b surrounding the opening 16 are plated with the magnetic material 15, so that the magnetic flux leaks out only from the opening 16 to the outside.

Therefore, if the eddy current loss measuring sensor 10 is arranged in the vicinity of the conductive film 9 so that the parabola drawn by the lines of magnetic flux leaking out from the opening 16 reaches the interior of the conductive film 9, the eddy current is locally excited only in a region below the coil 12. If the variation in impedance of the coil 12, to which the synthetic magnetic field of the magnetic field generated by the eddy current and the magnetic field generated from the coil 12 is applied, or the variation in current value or phase of the high frequency current is measured, it is possible to locally measure the quantity of eddy current loss.

Figure 2:
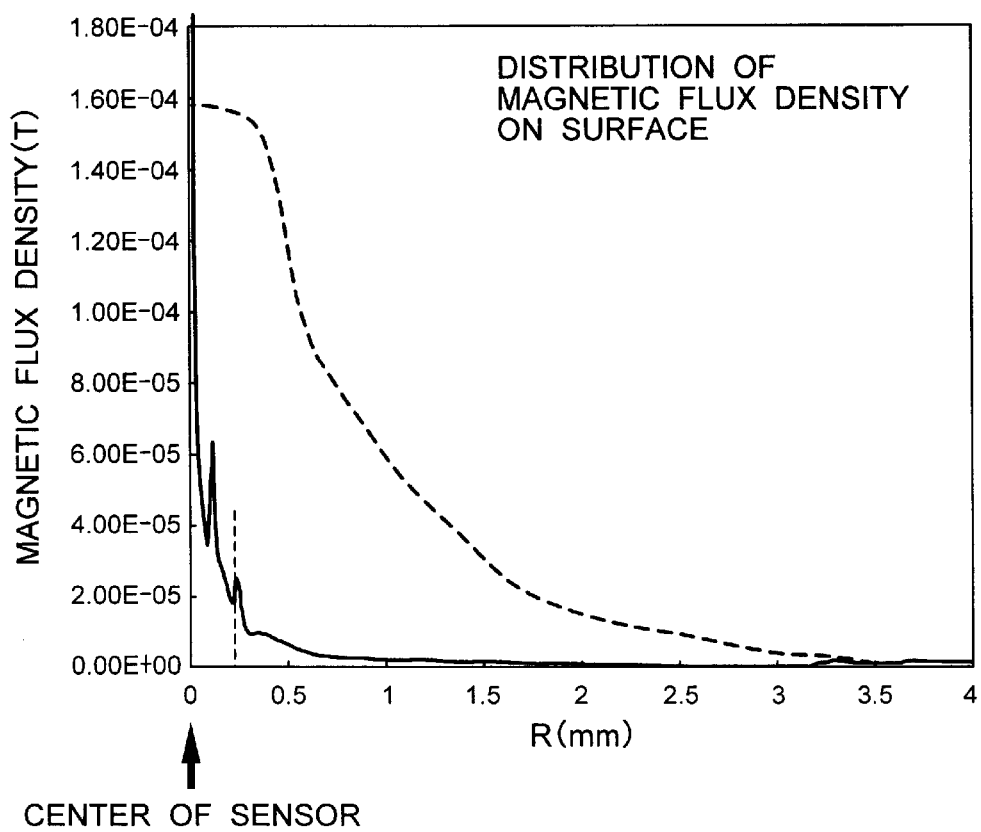
FIG. 2 is a graph showing a simulated distribution of a magnetic flux generated from an eddy current sensor.

FIG. 2 is a graph showing a simulated magnetic flux density distributed on the surface of the conductive film 9 when a high frequency current is supplied to the eddy current loss measuring sensor 10. In this figure, the solid line shows a simulated result when the eddy current loss measuring sensor 10 is used, and the dotted line shows a simulated result when an example of a conventional eddy current loss measuring sensor is used. As can be clearly seen from FIG. 2, according to this preferred embodiment, the magnetic flux density is localized to be distributed within a region having a radius (R) of about 0.3 mm from the center of the sensor, so that it is distributed only within a far smaller region that that in the prior art.

Thus, according to the eddy current loss measuring sensor 10 in this preferred embodiment, the magnetic flux leaks out only from the opening 16 to the outside, so that the eddy current can be generated only in a very small region in the conductive film 9 if the opening 16 is arranged so as to face the conductive film 9 and so as to be spaced from the conductive film 9 by a distance, e.g., 0.3 mm, by which a sufficient number of lines of magnetic flux pass through the conductive film 9. Since the synthetic magnetic field varies due to the influence of the eddy current, the quantity of eddy current loss can be precisely measured by measuring the variation in impedance of the eddy current loss measuring sensor 10 or the variation in current value or phase of the high frequency current.

(b) Second Preferred Embodiment Of Eddy Current Loss Measuring Sensor

Figure 3A:
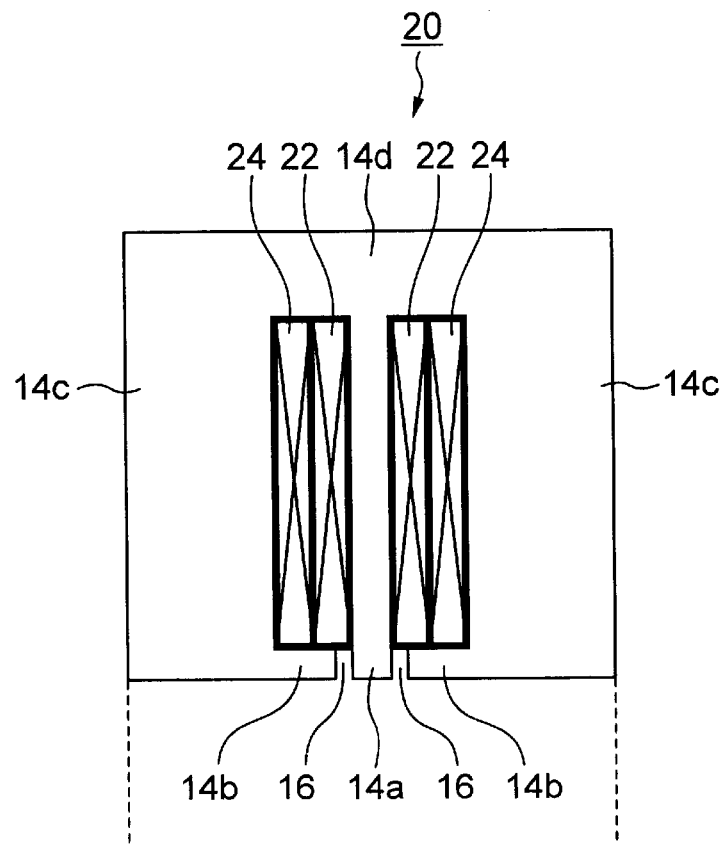
FIGS. 3A and 3B are sectional and bottom views schematically showing the construction of the second preferred embodiment of an eddy current loss measuring sensor according to the present invention.
Figure 3B:
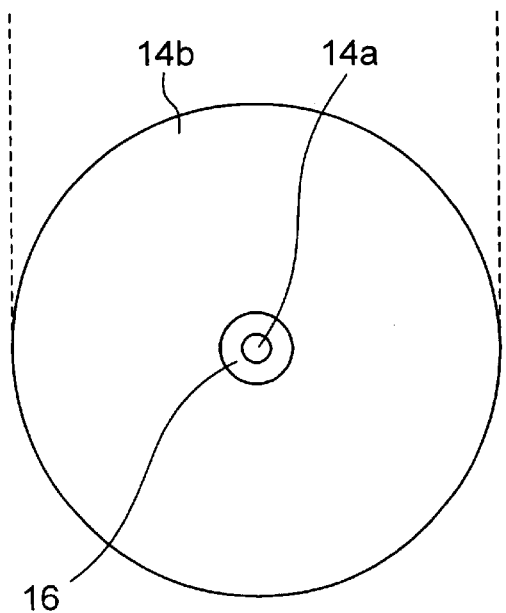

Referring to FIGS. 3A and 3B, the second preferred embodiment of an eddy current loss measuring sensor according to the present invention will be described below.

FIG. 3A is a schematic sectional view showing an eddy current loss measuring sensor 20 in this preferred embodiment, and FIG. 3B is a bottom view thereof. As can be clearly seen from the comparison with FIGS. 1A and 1B, the feature of this preferred embodiment is that an eddy current exciting coil 24 and a receiving coil 22 are provided as coils in the sensor. Other constructions are substantially the same as those of the above described eddy current loss measuring sensor 10. The operation of the eddy current loss measuring sensor 20 in this preferred embodiment is also substantially the same as that in the above described first preferred embodiment.

Thus, according to this preferred embodiment, the two separate coils, which have the functions of exciting the eddy current and receiving the eddy current loss, respectively, are used, it is possible to provide an eddy current loss measuring sensor having a more excellent resolution.

In the above described two preferred embodiments, while the ferrite members 14b through 14d have been formed so as to cover the ferrite core 14a and the coil 12 or the coils 22 and 24 except for the opening 16, the shape of the ferrite members 14b through 14d of the eddy current loss measuring sensor according to the present invention should not be limited thereto if the magnetic flux locally leaks out from the opening 16 to the outside. For example, a film of a magnetic material may be applied only on the surface of regions of the ferrite core 14a and ferrite member 14b below the coil(s), or a film of a magnetic material may be applied only on the outer peripheral surface of the ferrite member 14c. In addition, while the ferrite material has been used as the first and second magnetic permeable materials, the present invention should not be limited thereto, but another magnetic permeable material may be used if it has a high magnetic permeability $\mu$. Moreover, the magnetic permeability of the whole first and second magnetic permeable members is not required to be uniform. If the leaking magnetic flux can be localized only in a localized region of the conductive film 9, the magnetic permeable material of a part or all thereof can be replaced with a magnetic permeable material having a higher magnetic permeability.

(2) Preferred Embodiments of Thickness Measuring System

Referring to the accompanying drawings, some preferred embodiments of a thickness measuring system according to the present invention will be described below.

(a) First Preferred Embodiment Of Thickness Measuring System

Figure 4:
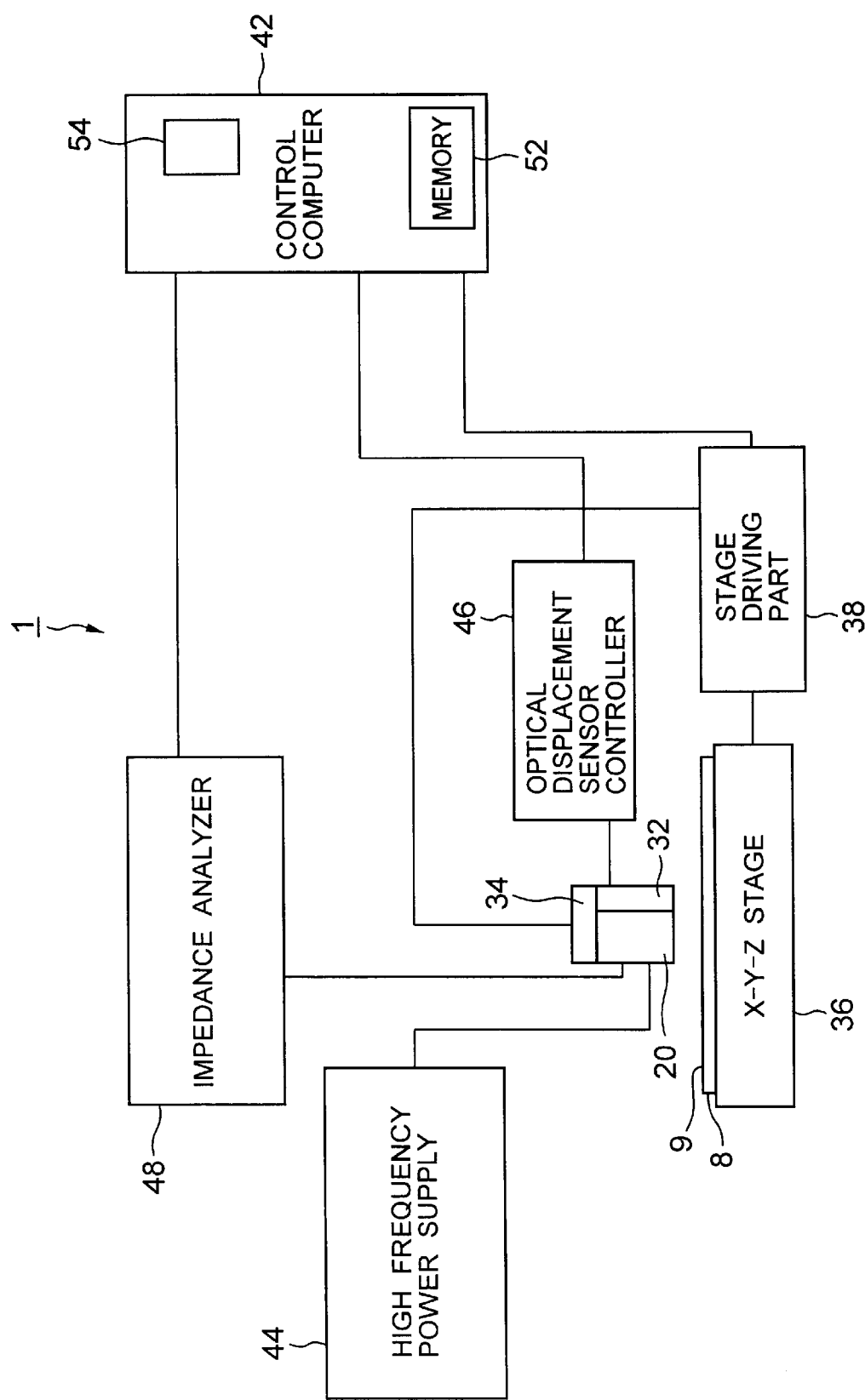
FIG. 4 is a block diagram schematically showing the construction of the first preferred embodiment of a thickness measuring system according to the present invention.

FIG. 4 is a block diagram schematically showing the construction of the first preferred embodiment of a thickness measuring system according to the present invention. As shown in this figure, the thickness measuring system 1 in this preferred embodiment comprises, an X-Y-Z stage 36, an eddy current loss measuring sensor 20 which has been described above, a Z stage 34, a stage driving part 38, an optical displacement sensor 32, an optical displacement sensor controller 46, a high frequency power supply 44, an impedance analyzer 48, and a control computer 42 for controlling the whole system.

The X-Y-Z stage 36 is designed to support thereon a semiconductor wafer 8 on which a conductive film 9 (see FIG. 1) serving as an object to be measured has been deposited, and to receive a control signal from the stage driving part 38 to move the semiconductor wafer 8 in optional X-Y-Z directions. The X-Y-Z stage 36 is formed of an insulating material or a material having a low conductivity, and is designed to generate no eddy current or only a very small quantity of eddy current capable of being ignored in measurement, even if it receives a high frequency magnetic field generated by the eddy current loss measuring sensor 20.

The optical displacement sensor 32 is designed to measure the distance between the eddy current loss measuring sensor 20 and the conductive film 9 in response to a control signal supplied from the optical displacement sensor controller 46, to supply the measured value to the control computer 42 via the optical displacement sensor controller 46. The optical displacement sensor 32 and the optical displacement sensor controller 46 constitute a distance measuring part in this preferred embodiment.

The Z stage 34 is designed to suspend and support the eddy current loss measuring sensor and to receive a control signal supplied from the stage driving part 38 to move the eddy current loss measuring sensor in Z directions.

The stage driving part 38 is designed to receive a command signal from the control computer 42 to supply a control signal to the X-Y-Z stage 36 and the Z stage 34.

The high frequency power supply 44 is designed to supply a desired high frequency current to an eddy current exciting coil 24 (see FIG. 3) of the eddy current loss measuring sensor on the basis of a command signal supplied from the control computer 42. The frequency of the current is in the range of from about 1 MHz to about 10 MHz in this preferred embodiment.

The eddy current exciting coil 24 having received the high frequency current forms a high frequency magnetic field, by which an eddy current is locally generated in the conductive film 9. The receiving coil 22 is designed to receive a synthetic magnetic field of a magnetic field generated by the eddy current in the conductive film 9 and a magnetic field generated by the coil 24.

The impedance analyzer 48 is connected to the receiving coil 22 (see FIG. 3) of the eddy current loss measuring sensor 20 to supply a measuring high frequency current to the receiving coil 22 to measure the variation in impedance of the eddy current loss measuring sensor 20 due to the influence of the eddy current loss, the variation in current value of the measuring high frequency current due to the influence of the eddy current loss, or the variation in phase of the measuring high frequency current due to the influence of the eddy current loss to supply the measured result to the control computer 42.

The control computer 42 has a thickness operation part 54 and a memory 52.

The memory 52 is designed to store therein a recipe file including a program for a measuring procedure and various measuring data tables.

Measuring data include data on the variation of impedance of the eddy current loss measuring sensor, the variation in current value of the measuring high frequency current of the impedance analyzer 48 or the variation in phase of the measuring high frequency current, which are influenced by the eddy current loss, with respect to the distance $D_{SF}$ between the eddy current loss measuring sensor 20 and the conductive film 9, the frequency f of the current supplied from the high frequency power supply 44, the thickness t of the conductive film 9 and the specific resistance $\rho$ of the conductive film 9. These data are used for calculating the thickness t or correcting the distance $D_{SF}$ between the eddy current loss measuring sensor 20 and the conductive film 9.

The control computer 42 is designed to read the recipe file out of the memory 52 to control the above described respective components of the measuring system 1 on the basis of the measuring program included in the recipe file.

Figure 5:
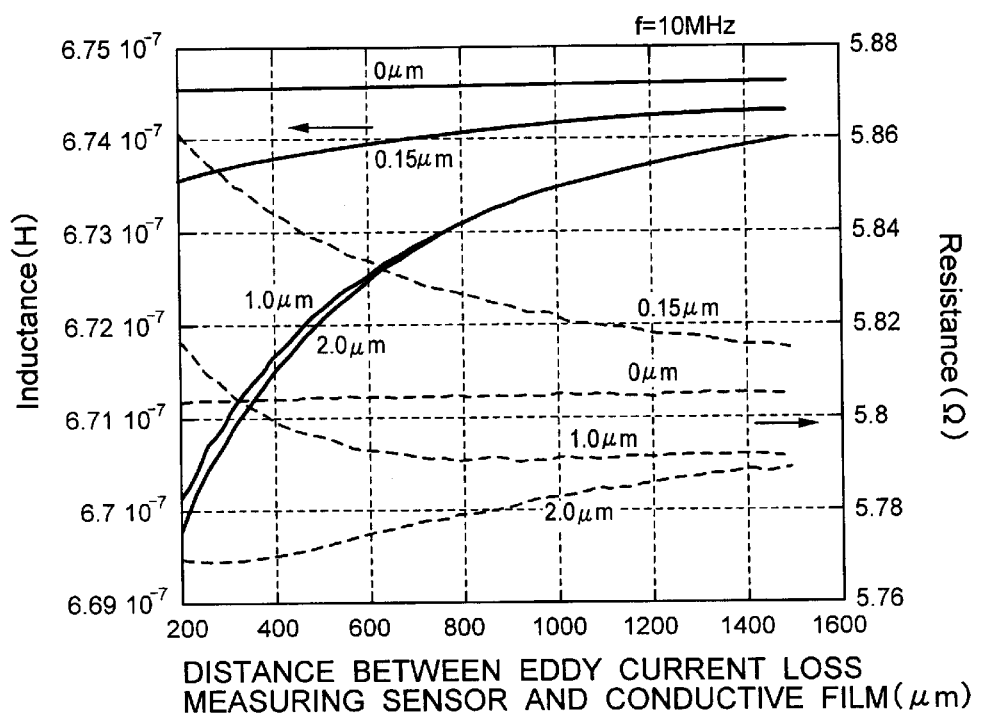
FIG. 5 is a graph showing experimental data on the relationship between the distance between an eddy current sensor and a conductive film, and the variations in inductance and resistance of the eddy current sensor.
Figure 6:
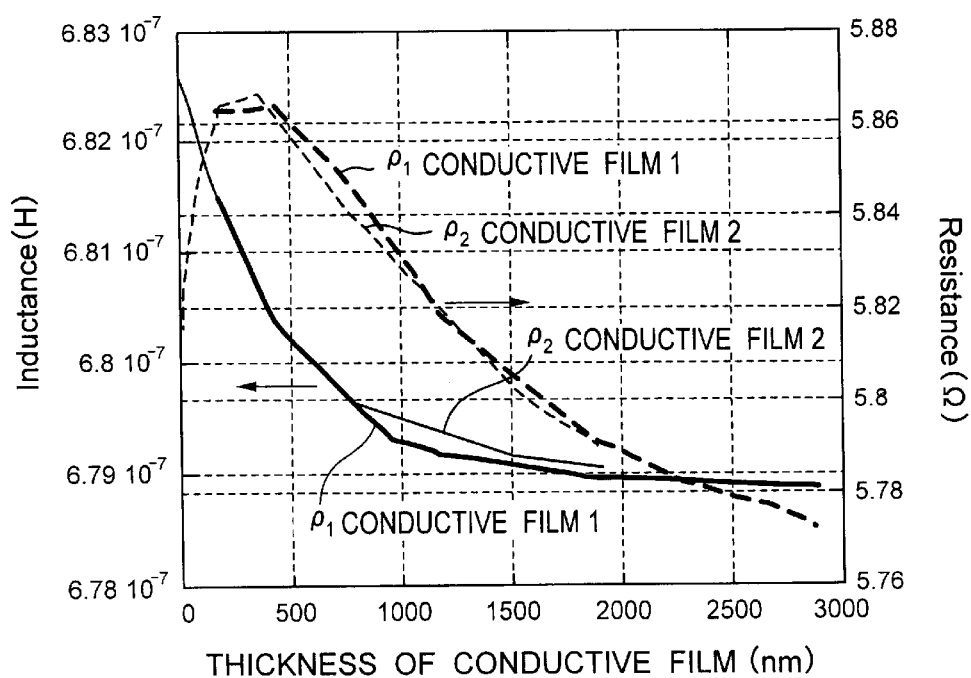
FIG. 6 is a graph showing experimental data on the relationship between the variation in thickness of a conductive film and the variations in inductance and resistance of an eddy current sensor.

FIGS. 5 and 6 show examples of measuring data tables included in the recipe file. FIG. 5 shows an example of the variations in inductance L (H) and value of resistance R (Ω) of the eddy current loss measuring sensor 20, with respect to the distance $D_{SF}$ between the eddy current loss measuring sensor 20 and the conductive film 9, using the thickness t (0, 0.15, 1.0, 2.0) μm as a parameter. FIG. 6 shows an example of the variations in inductance L (H) and value of resistance R (Ω) of the eddy current loss measuring sensor 20, with respect to the distance $D_{SF}$ between the eddy current loss measuring sensor 20 and the conductive film 9, using the specific resistance ρ ($ρ_1$, $ρ_2$) as a parameter. In both figures, the solid line shows the variation in inductance L, and the dotted line shows the variation in value of resistance R.

The thickness operation part 54 of the control computer 42 is designed to calculate the thickness t of the conductive film 9 by comparing the measured result supplied from the impedance analyzer 48 with the data table in the recipe file.

A thickness measuring method using the thickness measuring system 1 shown in FIG. 4 will be described below.

The thickness measuring system 1 in this preferred embodiment can carry out the above described thickness measurement as a pipe line in parallel to a conductive film depositing step, an etching step or a polishing step in a semiconductor fabricating process.

As thickness measuring methods, there are a first measuring method for measuring the thickness while holding the constant distance between the conductive film 9 and the eddy current loss measuring sensor 20, a second measuring method for correcting the measured value of the thickness t calculated from the measured result of the impedance analyzer 48 using the measured result of the distance between the conductive film 9 and the eddy current loss measuring sensor 20, and a third measuring method for previously acquiring the variation in distance between the conductive film 9 and the eddy current loss measuring sensor 20 as a data table prior to the measurement of the thickness, to measure the thickness of the conductive film 9 while removing measurement errors due to the warp of the wafer or the like on the basis of the data table.

The first measuring method includes a process for operating both of the X-Y-Z stage 36 and the Z stage 34 by the stage driving part 38 on the basis of the measured result of the optical displacement sensor 32. The second method includes a process for correcting the measured value of the thickness t on the basis of the measured result of the optical displacement sensor 32 without operating the Z stage 34. The third measuring method includes a process for approximately calculating the displacement of the thickness measuring point in the measurement range with respect to the measured result of the distance obtained by a pre-scanning.

Although the thickness measuring system 1 shown in FIG. 4 can be applied to any one of the first and second measuring methods, a case where the system 1 is applied to the first measuring method will be described below.

During measurement, a value serving as a measurement reference (which will be hereinafter referred to as a "reference value") is sequentially measured to correct measurement errors (first correcting process). Because the drift of the measured value sometimes occurs since the ambient temperature around the thickness measuring system 1 varies or the fluctuation of the impedance analyzer 48 itself occurs during the deposition step, etching step or polishing step.

Figure 7:
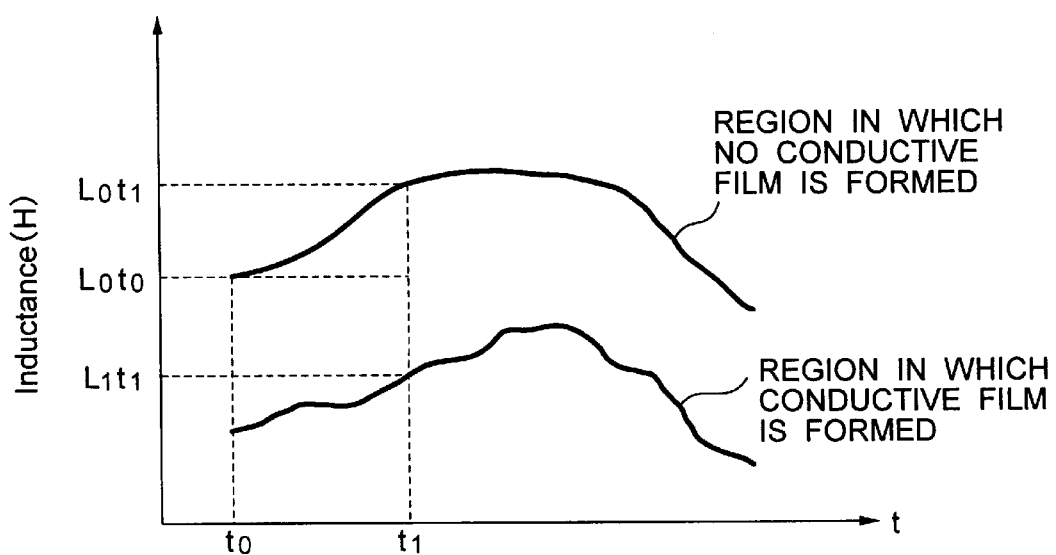
FIG. 7 is a graph for explaining a method for correcting thickness measurement errors.

Specifically, in parallel to the measurement of the thickness of the conductive film 9, the impedance of the eddy current loss sensor, the current value of the high frequency current or the phase of the high frequency current is sequentially measured in a region which is not influenced by the eddy current loss in a region surrounding the X-Y-Z stage 36. For example, as shown in FIG. 7, when the inductance of a region, in which the conductive film 9 has not been deposited, is $L_{0t0}$ at a measurement start time $t_0$ to increase to $L_{0t1}$ at t1 with the elapse of deposition time t, it can be determined that ($L_{0t1}-L_{0t0}$) is a measurement error. Therefore, a correction processing for subtracting $L_{0t0}$ from the measurement result $L_{1t1}$ in a region, in which the conductive film 9 has been deposited, is carried Out.

First, the frequency f of the high frequency current supplied from the high frequency power supply 44 is set. The frequency f is set so as to be optimum on the basis of the data table showing the relationship between thickness and resolution in the recipe file, referring to a target thickness t, i.e., a design thickness, when the conductive film 9 serving as an object to be measured is deposited.

Figure 8:
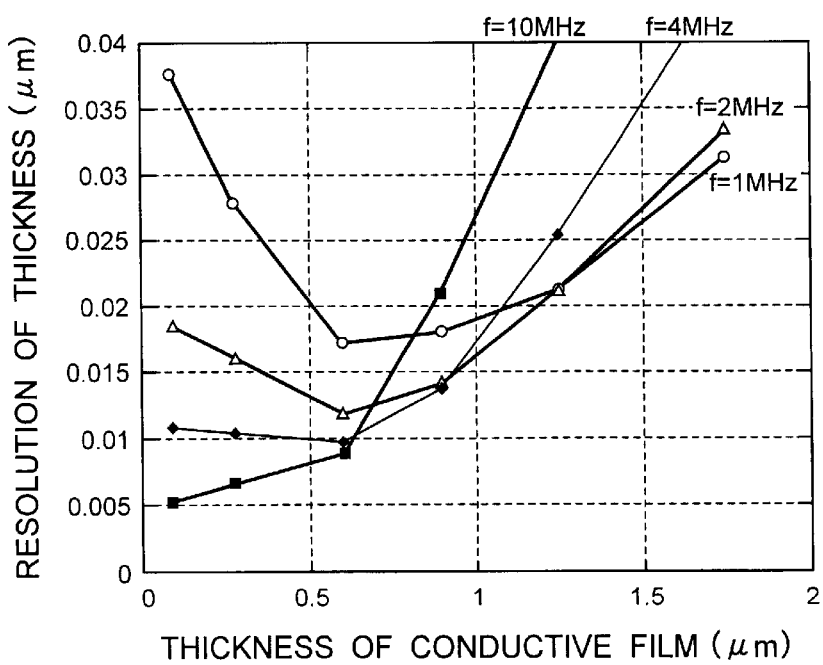
FIG. 8 is a graph showing experimental data on the relationship between the thickness of a film and the resolution of a measuring system, using the frequency of a high frequency current as a parameter.

FIG. 8 shows an example of the measured result concerning the relationship between the thickness t (μm) of the conductive film 9. and the resolution (μm) of the measuring system using the frequency f as a parameter. As can be seen from this figure, as the target thickness t of the conductive film 9 is small, the resolution of the system can be enhanced by increasing the frequency of the used high frequency current. This utilizes a characteristic that the permeating depth of an eddy current into a conductive film varies in accordance with the frequency of a magnetic field for exciting the eddy current.

When the high frequency current, the frequency f of which has been thus set, is supplied to the eddy current loss measuring sensor 20 to generate a high frequency magnetic field from the eddy current exciting coil 24 to allow a magnetic flux leaking out of the opening 16 to pass through the conductive film 9, an eddy current is excited in the conductive film 9, and an eddy current loss P expressed by the following expression 1 occurs:

$$P=(f^2 \cdot t)/\rho \qquad (1)$$

wherein the specific resistance ρ of the conductive film 9 is previously given from the material of the conductive film 9 which is intended to be deposited.

If such an eddy current loss P is generated in the conductive film 9, the impedance of the receiving coil 22, the current value of the measuring high frequency current flowing through the receiving coil 22 or the phase of the high frequency current varies in accordance with the thickness t of the conductive film 9.

Figure 9:
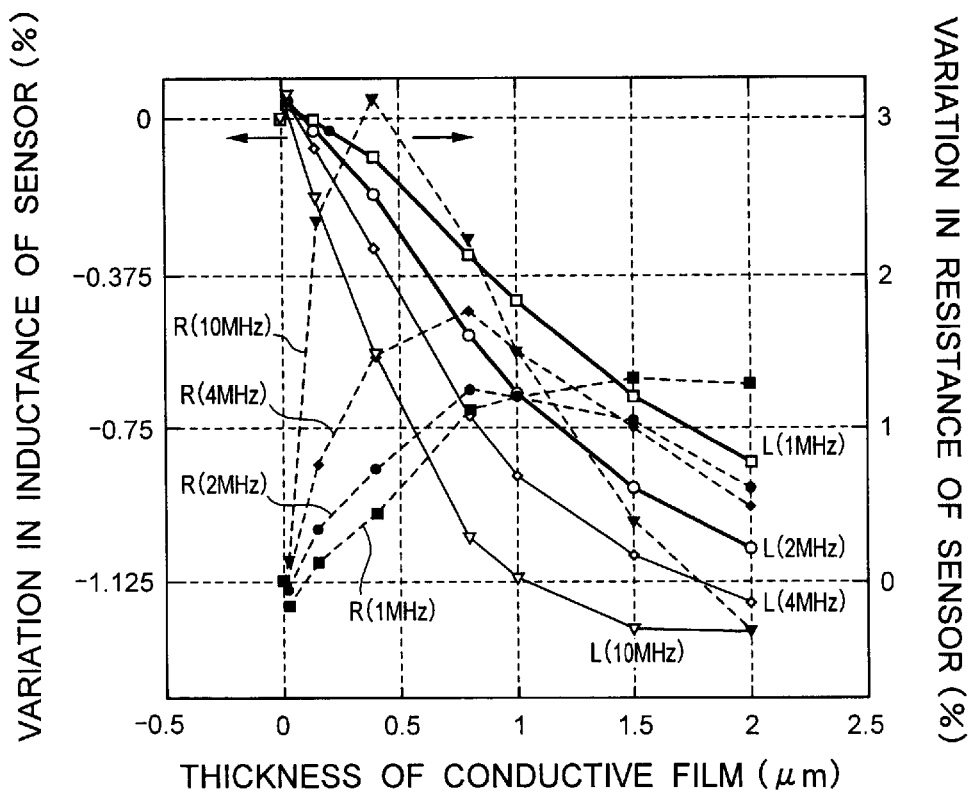
FIG. 9 is a graph showing experimental data on the variations in inductance and value of resistance of an eddy current loss measuring sensor when the thickness of a conductive film varies.

FIG. 9 shows an example of the measured variation in inductance and value of resistance of the eddy current loss measuring sensor when the thickness t of the conductive film 9 varies with the proceeding of the deposition. In this figure, the solid line shows the variation in inductance L, and the dotted line shows the variation in value of resistance R.

The impedance analyzer 48 monitors the variation shown in FIG. 9 to supply the monitored result to the control computer 42. The thickness operation part 54 of the control computer 42 operates and outputs the thickness t while referring to the data table which has been written in the previously prepared recipe file and which shows the relationship between the thickness t and the value of resistance of the film.

The thickness measuring system 1 carries out the above described thickness measurement over the whole surface of the wafer 8. That is, the X-Y-Z stage 36 continuously moves in accordance with the procedure preset in the recipe file, so that the surface of the wafer 8 is scanned by the eddy current loss measuring sensor 20. The control computer 42 outputs the value of the thickness t, which has been calculated by the thickness operation part 54, so as to correspond to (X, Y) coordinates of the wafer 8.

When a pattern is formed on the surface of the wafer 8, the thickness t of the conductive film 9 varies in accordance with the movement of the stage 36 by the proceeding of the deposition step, etching step or chemical mechanical polishing (CMP) step. For that reason, when the eddy current loss measuring sensor 20 scans on the wafer 8, the distance DSF between the eddy current loss measuring sensor 20 and the surface of the conductive film 9 varies due to the warp of the wafer 8, the inclination of the X-Y-Z stage 36 or the inclination of the Z stage 34. However, in this preferred embodiment, the control computer 42 supplies a control signal to the stage driving part 38 so that the distance DSF is constant on the basis of the measured value of the optical displacement sensor 32. On the basis of this control signal, the stage driving part 38 moves the X-Y-Z stage 36 and/or the Z stage 34 in Z directions, so that the distance DSF between the eddy current loss measuring sensor 20 and the conductive film 9 is held to be constant.

In the above described preferred embodiment, the reference value is sequentially measured during measurement in a region in which the conductive film has not been deposited, and measurement errors are corrected on the basis thereof. However, the reference value and the method for measuring the same should not be limited to those in the above described preferred embodiment. For example, a conductive film having a predetermined thickness may be previously deposited in a region, which is not influenced by the eddy current, to move the X-Y-Z stage 36 to the position of the conductive film prior to the measurement of the thickness, to measure the impedance of the eddy current loss measuring sensor 20, the current value of the measuring high frequency current or the phase of the measuring high frequency current to correct measurement errors using the measured value as the reference value. The number of the reference values should not be limited to one. A plurality of measuring conductive films having a plurality of thickness values and a plurality of conductivity values may be previously deposited in a region, which is not influenced by the eddy current, in accordance with the number and kind of deposition steps to correct measurement errors using a plurality of reference values.

Figure 10:
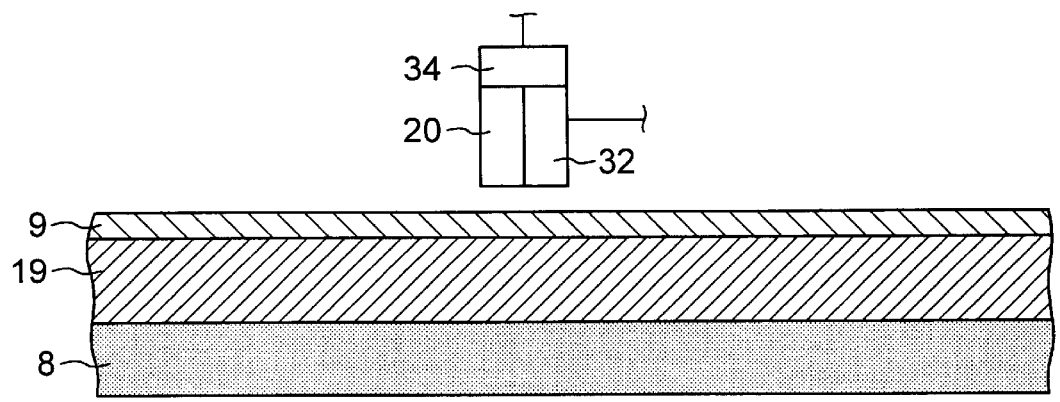
FIG 10 is a schematic sectional view showing a method for measuring a conductive film, which is deposited on a circuit pattern containing a conductive material or on an underlying conductive film, by means of the thickness measuring system shown in FIG. 4.

For example, as shown in the schematic sectional view of FIG. 10, there are some cases where the conductive film 9 serving as an object to be measured may be deposited on a circuit pattern, which is formed on a semiconductor substrate 8 and which includes a conductive material, or an underlying conductive film 19. In such cases, if the eddy current loss is intended to be measured from the top of the conductive film 9, an eddy current is also generated in the conductive material of the underlying circuit pattern or underlying conductive film 19. Therefore, the impedance analyzer 48 does not only measure the conductive film 9 serving as an object to be measured, but it also measures the eddy current loss in the underlying circuit pattern or underlying conductive film. The The thickness measuring system 1 in this preferred embodiment repeats the above described series of procedures to remove measurement errors due to the underlying circuit pattern or underlying conductive film. That is, prior to the deposition of the conductive film 9, the thickness (which will be hereinafter referred to as an "underlayer thickness value") obtained from the conductive material of the circuit pattern or the underlying conductive film 19 is measured. Then, after the conductive film 9 is deposited on the circuit pattern or underlying conductive film 19, the total thickness value of the underlayer thickness value and the thickness value of the conductive film 9 is measured. Finally, the previously measured underlayer thickness value is subtracted from the total thickness value after measurement. Thus, the thickness of only conductive film 9 can be precisely measured. In addition, when the measurement of the thickness is carried out in parallel to the step of depositing the conductive film 9, the result obtained by subtracting the above described previously obtained underlayer thickness value from the measured value of the total thickness value is outputted as the thickness value of the conductive film 9.

Second Preferred Embodiment of Thickness Measuring System

Figure 11:
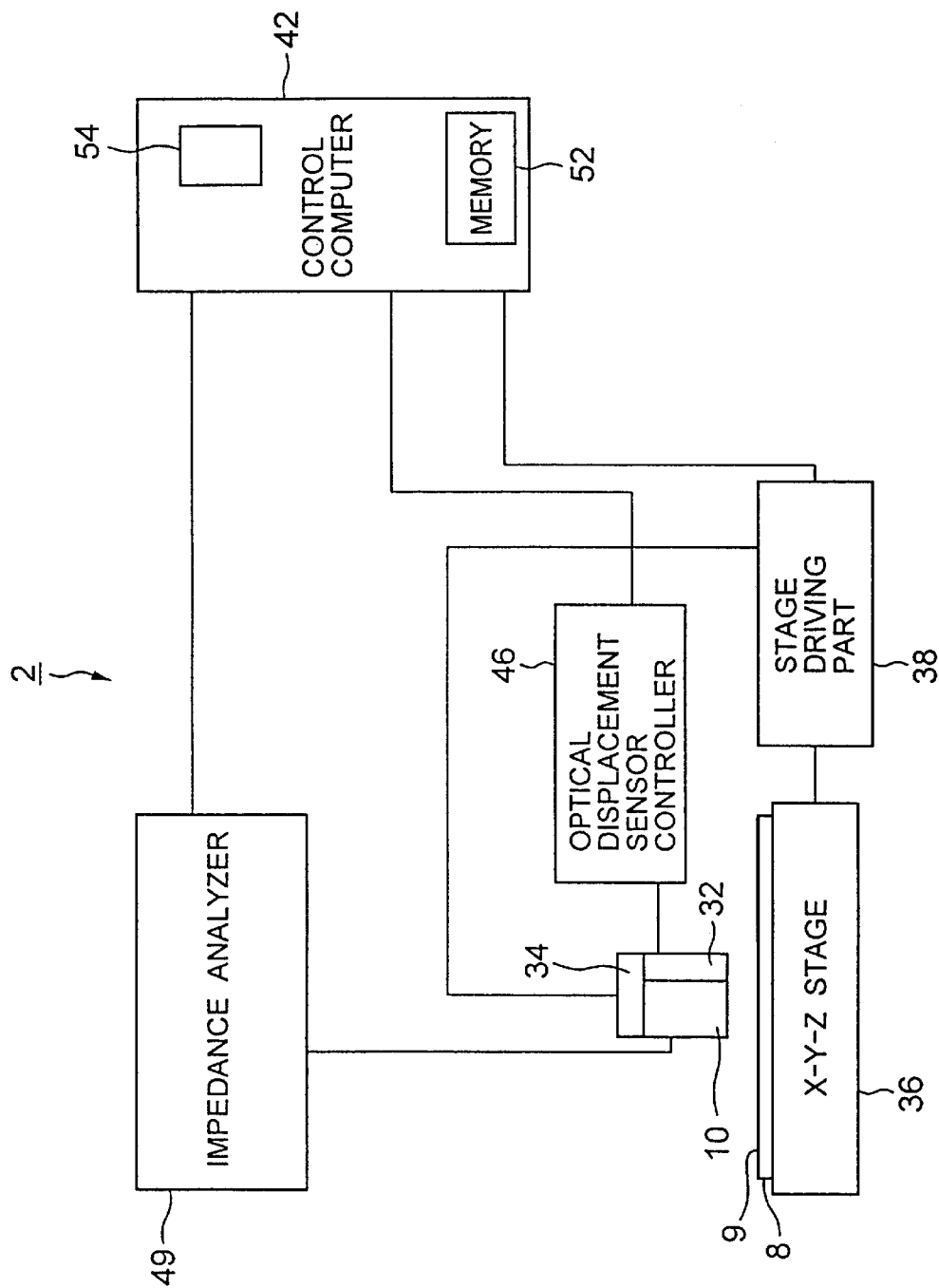
FIG. 11 is a block diagram showing a block diagram schematically showing the construction of the second preferred embodiment of a thickness measuring system according to the present invention.

FIG. 11 is a block diagram schematically showing the construction of the second preferred embodiment of a thickness measuring system according to the present invention. The thickness measuring system 2 shown in this figure has the above described exciting/receiving eddy current loss measuring sensor 10 shown in FIG. 1. In this preferred embodiment, an impedance analyzer 49 also serves as a high frequency power supply, and is designed to supply a high frequency current to an exciting/receiving coil 12 (see FIG. 1). Other constructions are substantially the same as those of the thickness measuring system 1 shown in FIG. 4.

A method for controlling the thickness measuring system 2 in this preferred embodiment and a thickness measuring method using the same are substantially the same as the methods described in (a), except that the impedance analyzer 49 also serves as the high frequency power supply. Therefore, a measuring method using the measuring system 2 in this preferred embodiment, to which the above described second measuring method is applied, will be typically described below.

Similar to the above described first measuring method, the reference value for measurement is sequentially measured during measurement to correct measurement errors (first correction process). Furthermore, as described above, in place of the method for sequentially measuring the reference value during the measurement, one or a plurality of reference values may be acquired from a previously deposited measuring conductive film prior to the measurement, to correct measurement errors on the basis thereof.

First, at the beginning of measurement, the frequency f of the high frequency current is set on the basis of the design thickness value and the data table in the recipe file.

Then, the high frequency current, the frequency f of which has been thus set, is supplied from the impedance analyzer 49 to the eddy current loss measuring sensor 20 to cause the coil 12 to excite a high frequency magnetic field to cause the conductive film 9 to locally excite an eddy current.

By the influence of the eddy current loss due to this eddy current, the impedance of the coil 12, the current value of the high frequency current supplied to the coil 12, or the phase of the high frequency current supplied to the coil 12 varies, so that the impedance analyzer 49 measure the variations in these values to supply the measured results to the control computer 42. The thickness operation part 54 of the control computer 42 calculates and outputs a thickness t while referring to the data table which has been written in the previously prepared recipe file and which shows the relationship between the thickness t and the value of resistance of the film.

The stage driving part 38 continuously moves the X-Y-Z stage 36 in accordance with a procedure preset in the recipe file. Thus, the eddy current loss measuring sensor scans on the surface of the wafer 8.

In this preferred embodiment, the thickness operation part 54 corrects the calculated thickness values on the basis of the measured value DSF supplied from the optical displacement sensor 32 (second correction process). The correction of the thickness values is carried out on the basis of the measurement data table (see FIG. 5) in the recipe file.

Moreover, the control computer 42 outputs the thickness value, which has been obtained by the calculation process and correction process, so as to correspond to (X, Y) coordinates of the wafer 8. Thus, the above described thickness measurement is carried out over the whole surface of the wafer 8.

Thus, according to the thickness measuring system 2 in this preferred embodiment, the calculated thickness value is corrected on the basis of the measured value $D_{SF}$, so that it is not required to cause the stage driving part 38 to control the relative positional relationship between the X-Y-Z stage 36 and the Z stage 34 to hold the constant distance between the conductive film 9 and the eddy current loss measuring sensor 10, unlike the above described thickness measuring system 1. As a result, the eddy current loss measuring sensor can more rapidly scan on the wafer 8, so that it is possible to precisely monitor the thickness in real time.

(c) Third Preferred Embodiment of Thickness Measuring system

Referring to the accompanying drawings, the third preferred embodiment of a thickness measuring system according to the present invention will be described below.

Figure 12:
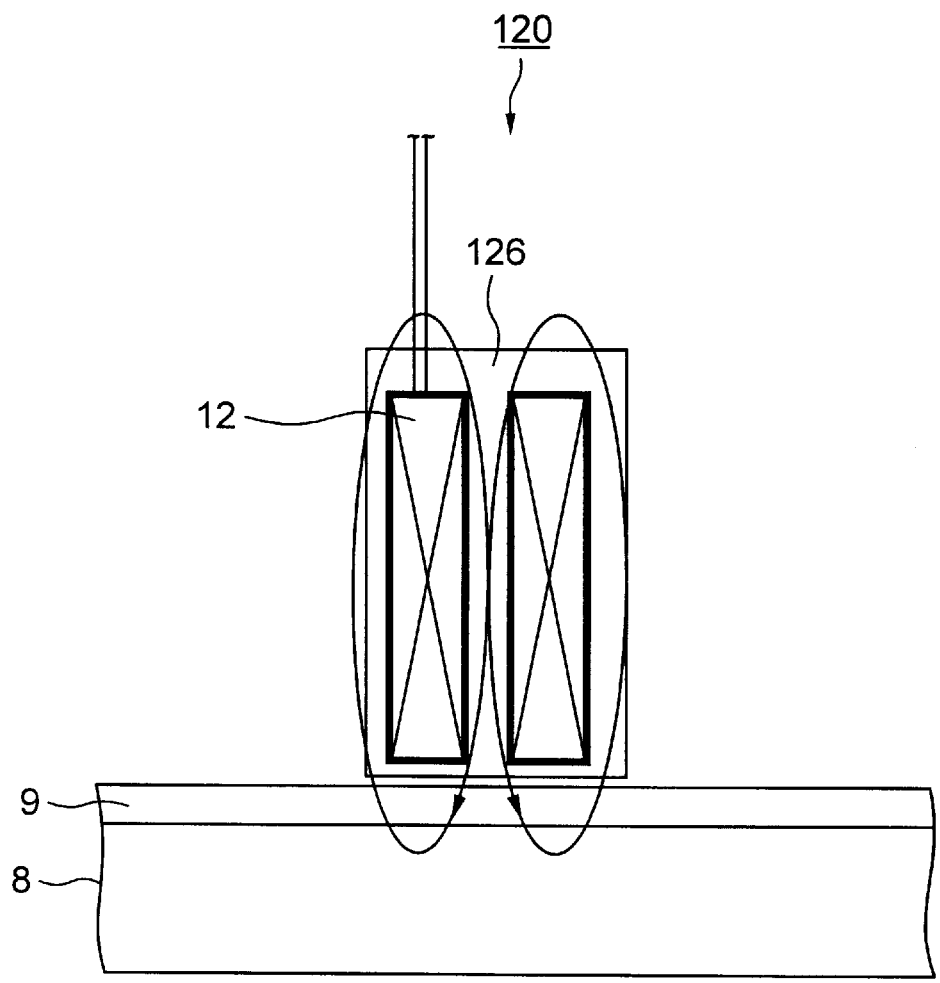
FIG. 12 is a sectional view schematically showing a n eddy current loss measuring sensor of the third preferred embodiment of a thickness measuring system according to the present invention.

The thickness measuring system 3 in this preferred embodiment has a conventional exciting/receiving eddy current loss measuring sensor 120 as an eddy current loss measuring sensor. Other constructions are substantially the same as those of the thickness measuring system 2 shown in FIG. 11, so that the whole schematic block diagrams thereof is omitted. In addition, a method for controlling the thickness measuring system 3 in this preferred embodiment and a thickness measuring method using the same are substantially the same as the methods described in (a) or (b). Therefore, referring to FIG. 12, the eddy current loss measuring sensor 120 will be described below.

The eddy current loss measuring sensor 120 of the thickness measuring system 3 in this preferred embodiment comprises a cylindrical exciting/receiving coil 12, and an insulating member 126 provided so as to cover the coil 12. The insulating member 126 is formed of an insulating material such as a resin or ceramic. The coil 12 is connected to an impedance analyzer (see FIG. 11).

The eddy current loss measuring sensor 120 is designed to receive a high frequency current of the impedance analyzer 49 to excite a high frequency magnetic field, and to receive a synthetic magnetic field, which is varied by an eddy current excited by a conductive film 9 serving as an object to be measured, to supply a current, in which an eddy current loss is reflected, to the impedance analyzer 49. There is formed a magnetic circuit wherein lines of magnetic flux MF1O generated by the coil 12 pass through the central axis of the coil 12 to leak out from the bottom of the coil to return toward the sensor 120 so as to draw an inverse parabola to return the central axis of the coil 12 again via the insulating member 126. Therefore, if the eddy current loss measuring sensor 120 is arranged above the conductive film 9 at a predetermined distance, the lines of magnetic flux MG10 leaking out of the central axis of the coil 12 to the outside can be controlled so as to pass through the conductive film 9, so that the eddy current is excited only around the magnetic field. From the high frequency current outputted from the coil 12 in response to the synthetic magnetic field varied by the eddy current, the variation of impedance of the eddy current loss measuring sensor 120, the variation in current value of the high frequency current or the variation in phase of the high frequency current is measured using the impedance analyzer 49, so that the quantity of the eddy current loss can be measured.

Thus, according to this preferred embodiment, is it possible to measure the quantity of the eddy current loss even if the conventional eddy current loss measuring sensor is used, so that the thickness t of the conductive film can be measured by the above described measurement procedure. The measuring method may be any one of the first and second measuring methods.

(d) Fourth Preferred Embodiment of Thickness Measuring System

Referring to the accompanying drawings, the fourth preferred embodiment of a thickness measuring system according to the present invention will be described below.

FIGS. 13A and 13B are schematic diagrams showing a principal part of a thickness measuring system in this preferred embodiment. As shown in FIG. 13A, the thickness measuring system 3 in this preferred embodiment comprises an eddy current loss measuring sensor 20 arranged above a conductive film 9, and further comprises an eddy current loss measuring sensor 20, which is arranged on the reverse side of a semiconductor wafer 8, i.e., on the opposite side to a surface on which the conductive film 9 has been deposited, and a Z-stage 35 for supporting the sensor on the top face thereof. The thickness measuring system 3 further comprises an X-Y-Z stage 37 for supporting thereon the peripheral portion of the semiconductor wafer 8, in place of the X-Y-Z stage 36. Other constructions of the thickness measuring system 3 are substantially the same as those of the thickness measuring system 1 shown in FIG. 4.

With this construction, the thickness measuring system 3 in this preferred embodiment is designed to excite a high frequency magnetic field by the eddy current loss measuring sensor 20 arranged on the reverse side of the wafer 8, in addition to the eddy current loss measuring sensor 20 arranged above the conductive film 9, to generate an eddy current in the conductive film 9 via the wafer 8 to detect a synthetic magnetic field, which has been varied by the generated eddy current, by the above described procedure to measure the thickness of the conductive film 9.

Thus, since the eddy current loss measuring sensor 20 is also arranged on the reverse side of the wafer 8, it is possible to eliminate the possibility of preventing the conductive film 9, which is deposited on the wafer 8, from being deposited on the reverse side of the wafer 8 during deposition and etching processes. Therefore, for example, as shown in FIG. 13B, the top face of the eddy current loss measuring sensor 20 may contact the reverse face to carry out the measurement. Moreover, during the CMP process, it is not required to scan while avoiding contacting a polishing tool. Thus, constraints on measurement are greatly reduced. Thus, according to this preferred embodiment, there is provided a thickness measuring system which has an excellent degree of freedom of design and an excellent throughput in measurement. The detailed measuring method is substantially the same as the procedure described in the first preferred embodiment or the second preferred embodiment.

(e) Fifth Preferred Embodiment of Thickness Measuring System

Referring to the accompanying drawings, the fifth preferred embodiment of a thickness measuring system according to the present invention will be described below. The thickness measuring system 4 in this preferred embodiment is characterized in that a plurality of eddy current loss measuring sensors are provided for rapidly and collectively measuring the thickness distribution of the conductive film 9 while greatly simplifying the scanning procedure of the sensors. Other constructions of the thickness measuring system 4 are substantially the same as those of the thickness measuring system 2 shown in FIG. 11.

Figure 14A:
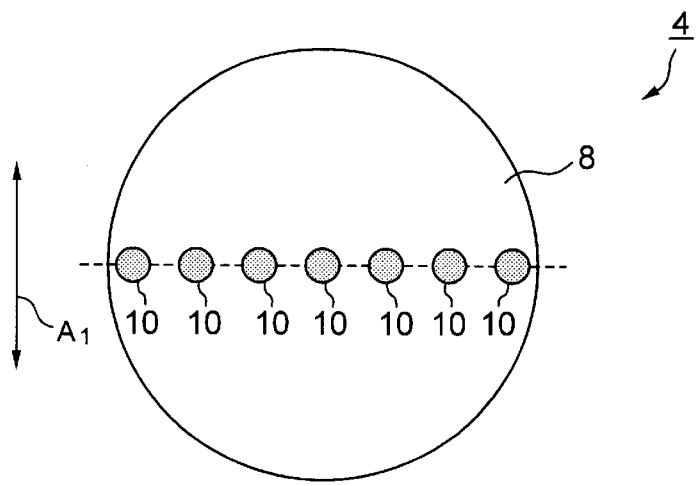
FIGS. 14A through 14C are schematic diagrams showing a principal part of the fifth preferred embodiment of a thickness measuring system according to the present invention.
Figure 14B:
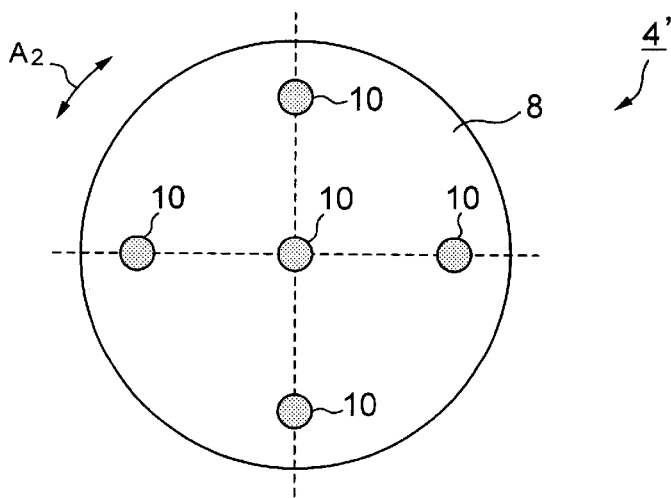
Figure 14C:
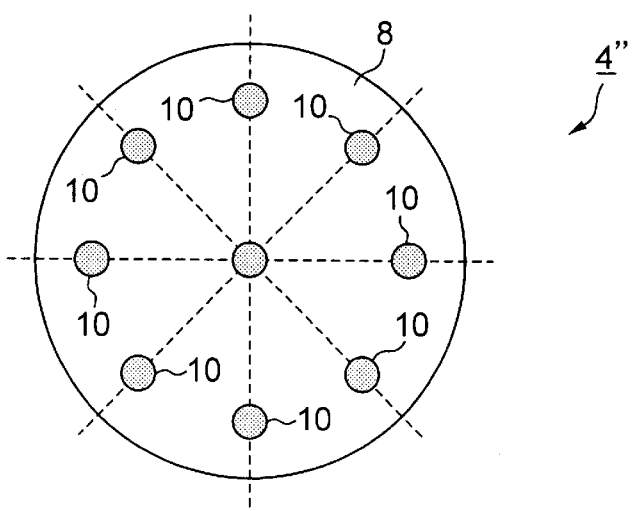

FIGS. 14A through 14C are schematic diagrams showing a principal part of the fifth preferred embodiment of a thickness measuring system according to the present invention. These figures are plan views which are viewed from the top of the wafer 8, and show examples of arrangements of a plurality of sensors.

FIG. 14A shows an example where eddy current loss measuring sensors 10 are linearly arranged at regular intervals. In the case of this example, if only the wafer 8 is moved in a direction perpendicular to the line of the sensors as shown by arrow A1 in the figure, it is possible to scan the whole surface of the conductive film 9 deposited on the surface of the wafer 8, so that it is possible to rapidly measure the thickness distribution of the conductive film 9.

FIG. 14B shows an example where eddy current loss measuring sensors 10 are arranged at regular intervals so as to extend in two directions perpendicular to each other. In the case of this example, after the X-Y-Z stage 36 is moved so that the eddy current loss measuring sensor 10 at the center of the cross is arranged above the center of the wafer 8, if only the X-Y-Z stage 36 is rotated clockwise or counterclockwise as shown by arrow A in the figure, it is possible to scan the whole surface of the conductive film 9 deposited on the surface of the wafer 8, so that it is possible to rapidly measure the thickness distribution of the conductive film 9.

FIG. 14C shows an example where eddy current loss measuring sensors 10 are radially arranged. With such arrangement, the eddy current loss measuring sensor 10 correspond to the whole area required to measure the thickness of the conductive film 9, so that it is possible to measure the thickness of the conductive film 9 substantially over the whole conductive film by one measurement. Therefore, in the case of this example, it is not required to move the stage 36 during the deposition step. Thus, the thickness of the conductive film 9 can be collectively measured, so that the thickness distribution can be very rapidly measured. As a result, even if the measuring time is limited when a very thin conductive film is deposited, there is provided a thickness measuring system capable of precisely and collectively measuring the thickness of the film. Moreover, if this preferred embodiment is combined with the above described fourth preferred embodiment to arrange the systems above and on the reverse side of the conductive film 9, a larger number of eddy current loss measuring sensor 10 can be arranged at a time, so that it is possible to further improve the speed and precision of the measurement.

(f) Sixth Preferred Embodiment of Thickness Measuring System

Figure 15:
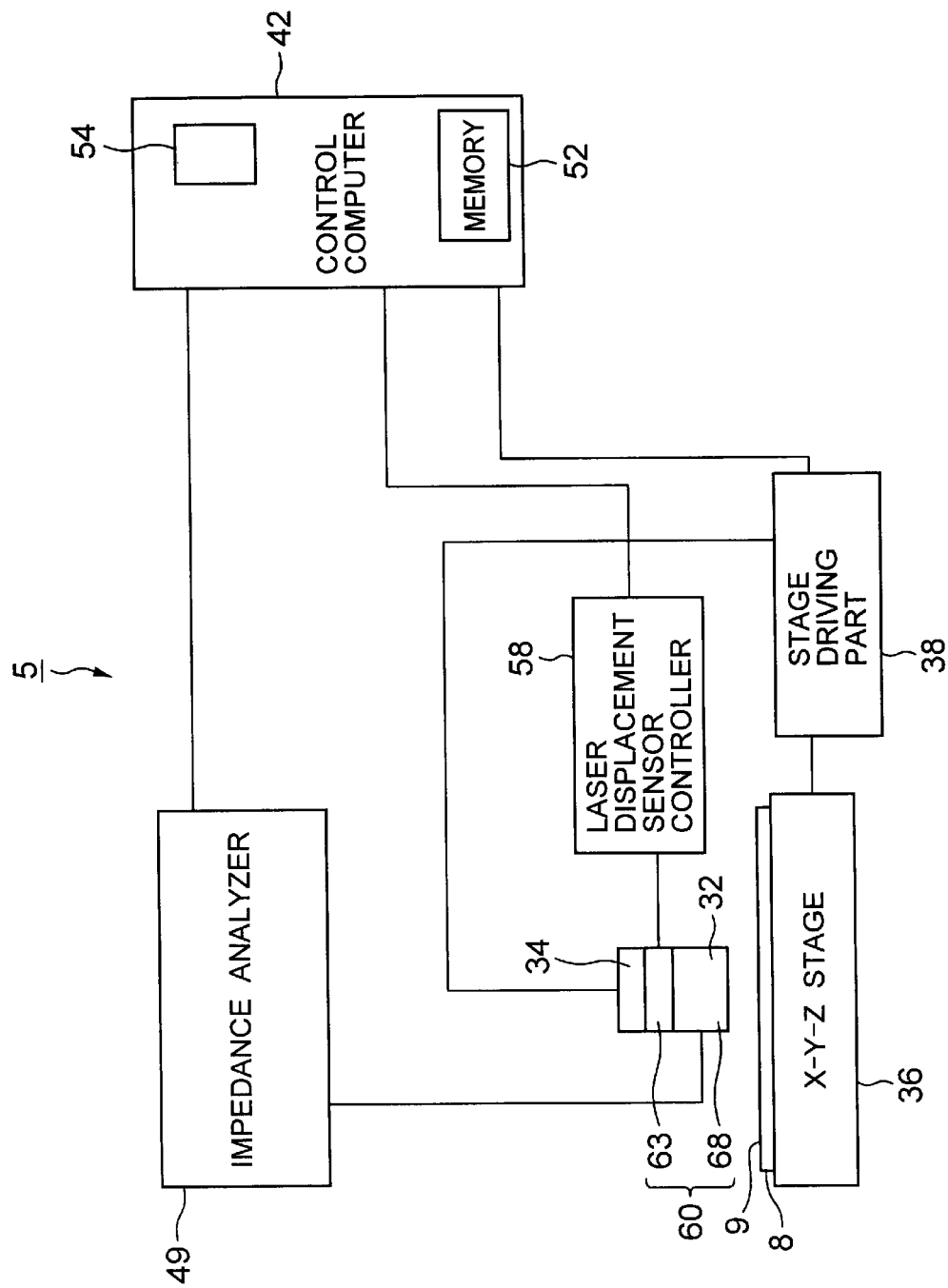
FIG. 15 is a block diagram schematically showing the construction of the sixth preferred embodiment of a thickness measuring system according to the present invention.
Figure 16:
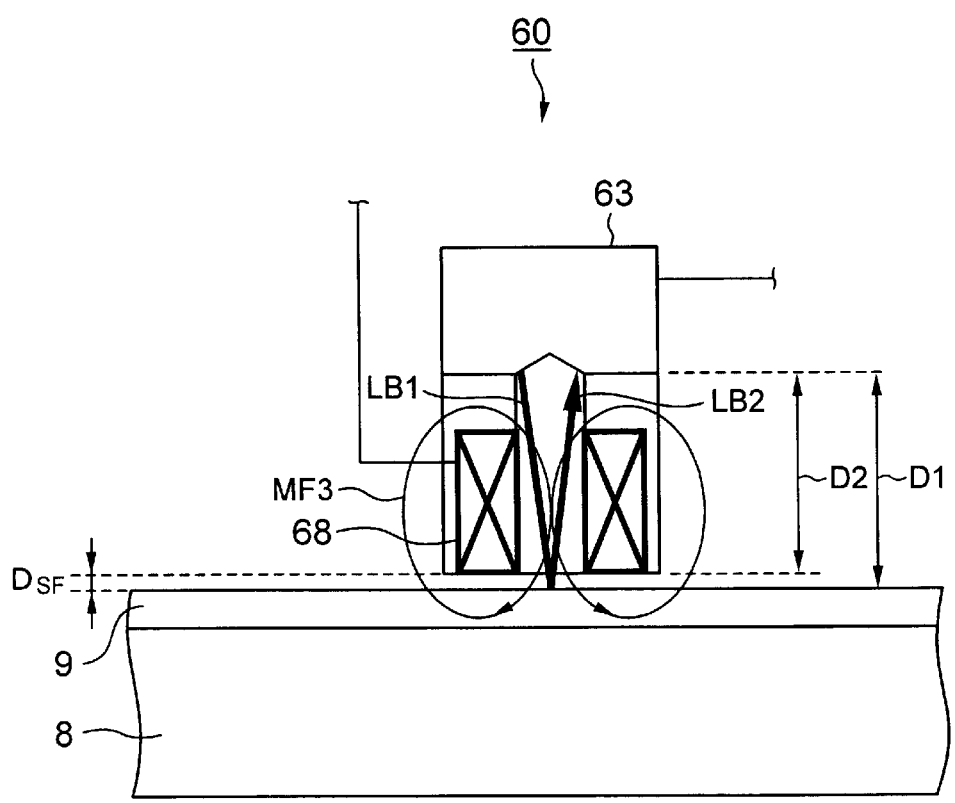
FIG. 16 is a sectional view showing the detailed construction of an eddy current loss measuring sensor unit of the thickness measuring system shown in FIG. 15.
Figure 17:
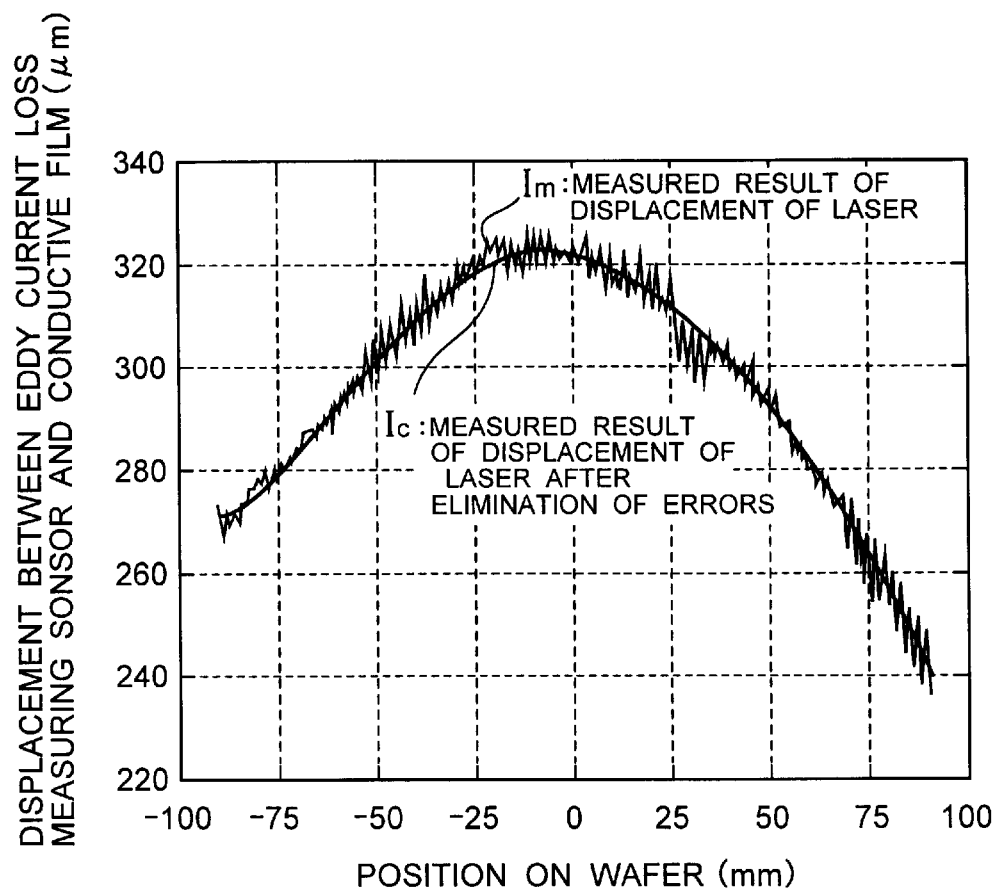
FIG. 17 is a graph for explaining a thickness measuring method using the thickness measuring system shown in FIG. 15.

Referring to FIGS. 15 through 17, the sixth preferred embodiment of a thickness measuring system according to the present invention will be described below. This preferred embodiment is characterized in that a laser displacement sensor is arranged coaxially with the central axis of an exciting/receiving coil serving as an eddy current loss measuring sensor to simultaneously carry out the measurement of an eddy current loss and the measurement of the distance of the eddy current loss measuring sensor and the surface of a conductive film.

FIG. 15 is a block diagram schematically showing the construction of a thickness measuring system in this preferred embodiment. As can be clearly seen from the comparison with the thickness measuring system 2 shown in FIG. 11, the thickness measuring system 5 shown in FIG. 15 comprises a laser displacement sensor 64 serving as an optical displacement sensor, and a laser displacement sensor controller 58 serving as an optical displacement sensor controller. The thickness measuring system 5 further comprises an air-cored exciting/receiving coil 68 serving as an eddy current loss measuring sensor. The exciting/receiving coil 68 and the laser displacement sensor 63 constitute an eddy current loss measuring sensor unit 60. Other constructions of the thickness measuring system 5 are substantially the same as those of the thickness measuring system 2 shown in FIG. 11. In this preferred embodiment, a control computer 42, the laser displacement controller 58 and a stage driving part 38 constitute a distance measuring error correcting part.

FIG. 16 is a sectional view schematically showing the eddy current loss measuring sensor unit 60 of the thickness measuring system 5 shown in FIG. 15. The laser displacement sensor 63 is arranged above the exciting/receiving coil 68 so that the intermediate point between a laser oscillating part and a laser beam receiving part is substantially coincident with the central axis of the exciting/receiving coil 68. Therefore, a laser beam LB1 emitted from the laser oscillating part passes through the air-core of the coil 68 to be incident on the surface of a conductive film 9, and its reflected light beams LB2 similarly passes through the air-core of the coil 68 to be incident on the laser light receiving part. Thus, a signal indicative of the distance Dl between the laser displacement sensor 63 and the conductive film 9 is supplied to the control computer 42 via the laser displacement sensor controller 58. A memory 52 previously stores therein the distance D2 between the bottom face of the laser displacement sensor 63 and the bottom face of the coil 68. The control computer 42 is designed to subtract the distance D2 from the distance Dl to calculate the distance $D_{SF}$ between the eddy current loss measuring sensor unit 60 and the conductive film 9.

In the above described preferred embodiment, the optical displacement sensor is adjacent to the eddy current loss measuring sensor in a direction horizontal to the conductive film 9, so that there is sometimes the difference between the result measured by the optical displacement sensor and the actual distance between the eddy current loss measuring sensor and the conductive film 9. On other hand, in the eddy current loss measuring sensor unit 60 shown in FIG. 15, a place substantially coincident with the intersection between the central axis of the coil 68 and the conductive film 9 is irradiated with the laser beam LB1, so that the distance $D_{SF}$ between the eddy current loss measuring sensor unit 60 and the conductive film 9 can be precisely measured.

A thickness measuring method using the thickness measuring system 5 shown in FIG. 15 will be described below.

The thickness measuring system 5 in this preferred embodiment can be substantially similarly applied to any one of the above described first through third measuring methods. However, as described above, according to the eddy current loss measuring sensor unit 60, the irradiation position of the conductive film 9 irradiated with the laser beam LB1 is substantially coincident with the position of the intersection between the center line of the coil and the surface of the conductive film 9. Therefore, if the first or second method is applied to the thickness measuring system 5 in this preferred embodiment, the measurement of the distance $D_{SF}$ between the eddy current loss measuring sensor unit 60 and the conductive film 9 and the measurement of the eddy current loss can be simultaneously carried out. In the above described preferred embodiment, since the optical displacement sensor is provided so as to be spaced from the eddy current loss measuring sensor, the eddy current loss measuring sensor must be moved by its distance in order to remove measurement errors. However, measurement errors are sometimes caused by the vibration of the stage during the movement of the eddy current loss measuring sensor and by the vibration of the eddy current loss measuring sensor itself. On the other hand, according to this preferred embodiment, since the distance DSF between the eddy current loss measuring sensor unit 60 and the conductive film 9 can be directly measured, such measurement errors can be removed and the number of operations of the stage can be reduced, so that it is possible to lighten the burden imposed on the performance of the stage. Thus, it is possible to precisely and rapidly measure the thickness, and the thickness measuring system can be miniaturized and simplified.

Referring to FIG. 17, the third measuring method for measuring a thickness using the thickness measuring system 5 in this preferred embodiment will be described below.

First, prior to the measurement of the thickness of the conductive film 9, the distance DSF between the sensor unit and the conductive film 9 is measured by the laser displacement sensor 63 at a predetermined number of points in a desired thickness measuring range on the conductive film 9. In the results of this measurement, measurement errors due to the warp of the wafer appear. FIG. 17 is a graph showing an example of the relationship between the position on the wafer and the distance $D_{SF}$ between the sensor unit and the conductive film 9. As shown by a graph lm in the figure, the result of measurement, the distance $D_{SF}$ acutely varies.

Then, the control computer 42 carries out processes, such as smoothing and polynomial approximation, with respect to the measured result to remove measurement errors to store the result in the memory 52. The graph 1c of FIG. 17 shows an example of an error processing which was carried out with respect to the measured result appearing on the graph 1m.

Then, the frequency f of a high frequency current supplied from an impedance analyzer 49 is set. That is, referring to a target thickness t when the conductive film 9 is deposited, a frequency f regarded as an optimum frequency is set on the basis of a data table (see FIG. 8) showing the relationship between thickness and resolution in a recipe file, and a high frequency current having the frequency f is supplied to the exciting/receiving coil 68 to generate a magnetic field. By this magnetic field, an eddy current is excited in the conductive film 9, and an eddy current loss P expressed by the above described expression 1 is generated in the conductive film 9.

If the eddy current loss P is generated in the conductive film 9, the impedance of the eddy current loss measuring sensor unit, or the current value or phase of a measuring high frequency current flowing through the exciting/receiving coil 68 varies in accordance with the thickness t of the conductive film 9 (see FIG. 9).

This variation is monitored by the impedance analyzer 49 to be supplied to the control computer 42. The thickness operator part 54 of the control computer 42 operates and outputs a thickness t while referring to a data table which has been written in the previously prepared recipe file and which shows the relationship between the thickness t and the value of resistance of the film and to a data table which has been written in the previously prepared recipe film and which shows the variation in distance $D_{SF}$ between the sensor unit and the conductive film 9 after removing measurement errors.

The thickness measuring system 5 carries out the above described thickness measurement with respect to a predetermined number of points in a desired measuring range on the wafer 8. Since an approximate function has been obtained by a prescanning for reducing errors, the measured points in the measurement of the eddy current are not required to be coincident with the measured points in the pre-scanning. The thickness operation part 54 calculates the thickness t of the conductive film 9 while referring to the previously obtained approximate function.

According to the above described third thickness measuring method, the data table concerning the variation in distance $D_{SF}$ between the sensor unit and the conductive film 9 is previously obtained using the laser displacement sensor 63, and the thickness is calculated from the data table using the approximate function from which measurement errors have been removed, so that it is possible to eliminate the problem that the precision of the optical displacement sensor is relatively low, while suppressing the number of eddy current loss measuring points to the necessary minimum number. Thus, it is possible to suppress the deterioration of the displacement measurement precision with respect to a conductive film having a large reflectance on an LSI pattern or a conductive film having a rough surface, so that the above described third thickness measuring method is particularly effective in a case where it is not required to measure the displacement every wafer, e.g., in a case where the warp of wafers is not greatly different, such as wafers in the same lot, wafers having the same circuit pattern, or wafers processed by the same process. Furthermore, while the X-Y-Z stage 36 have been provided in this preferred embodiment, the thickness of the conductive film 9 can be measured if the wafers are supported on, e.g., a robot arm, to be moved below the eddy current loss measuring sensor unit 60 even if the X-Y-Z stage 36 can not utilized.

(g) Seventh Preferred Embodiment of Thickness Measuring System

Referring to FIG. 18, the seventh preferred embodiment of a thickness measuring system according to the present invention will be described below. In this preferred embodiment, an eddy current loss measuring sensor unit 60 is arranged on the reverse side of the conductive film 9 of the thickness measuring system 5 shown in FIG. 15.

FIG. 18A and FIG. 18B are schematic diagrams showing a principal part of the thickness measuring system in this preferred embodiment. As shown in FIG. 18A, the thickness measuring system 5' in this preferred embodiment comprises an eddy current loss measuring sensor unit 60 arranged on the reverse side of a semiconductor wafer 8, i.e., on the opposite side to a surface of the semiconductor wafer 8, on which a conductive film 9 is deposited, and a Z-stage 35 for supporting the sensor unit on the top face thereof. Similar to the fourth preferred embodiment shown in FIG. 13B, the thickness measuring system 5' also comprises an X-Y-Z stage 37 for supporting thereon the peripheral portion of the semiconductor wafer 8, in place of the X-Y-Z stage 36. Other constructions of the thickness measuring system 5' are substantially the same as those of the thickness measuring system 5 shown in FIG. 15.

With this construction, the thickness measuring system 5' in this preferred embodiment is designed to excite a high frequency magnetic field by an exciting/receiving coil 68, which is arranged on the reverse side of the wafer 8, to generate an eddy current in the conductive film 9 via the wafer 8 to detect a synthetic magnetic film, which varies by the generated eddy current, to measure the thickness of the conductive film 9. The distance $D_{SF}$ between the sensor unit and the conductive film can be calculated from a distance (D3+Ts) if the distance D3 between the reverse of the wafer 8 and the eddy current loss measuring sensor unit 60 and the thickness Ts of the wafer 8 are previously obtained.

For example, as shown in FIG. 18B, the measurement may be carried out while the top face of the eddy current loss measuring sensor unit 60 contacts the reverse face of the wafer 8. In this case, it is not required to measure displacement.

Thus, according to the thickness measuring system 5' in this preferred embodiment, the eddy current loss measuring sensor unit 60 is arranged on the reverse side of the wafer 8, so that it is possible to eliminate the possibility of preventing the conductive film 9, which is deposited on the wafer 8, from being deposited during the deposition and etching processes. Moreover, during the CMP process, it is not required to measure the thickness while avoiding contacting a polishing tool. Thus, constraints on measurement are greatly reduced, so that the system can be operated as an in-situ type thickness measuring system for measuring a thickness in real time during a fabricating process, such as a depositing, polishing or etching process. Thus, according to this preferred embodiment, it is possible to provide a thickness measuring system which has an excellent degree of freedom of design, an excellent measurement precision and an excellent throughput. The detailed measuring method in the thickness measuring system 5' is substantially the same as the above described first through third measuring methods.

While the eddy current loss measuring sensor unit has been arranged only on the reverse side of the wafer in this preferred embodiment, the eddy current loss measuring sensor unit 60 may be arranged above the conductive film 9 in addition to the sensor unit 60 arranged on the reverse side of the conductive film 9 to measure a thickness from both sides similar to the fourth preferred embodiment shown in FIG. 13.

(h) Eighth Preferred Embodiment of Thickness Measuring System

Figure 19:
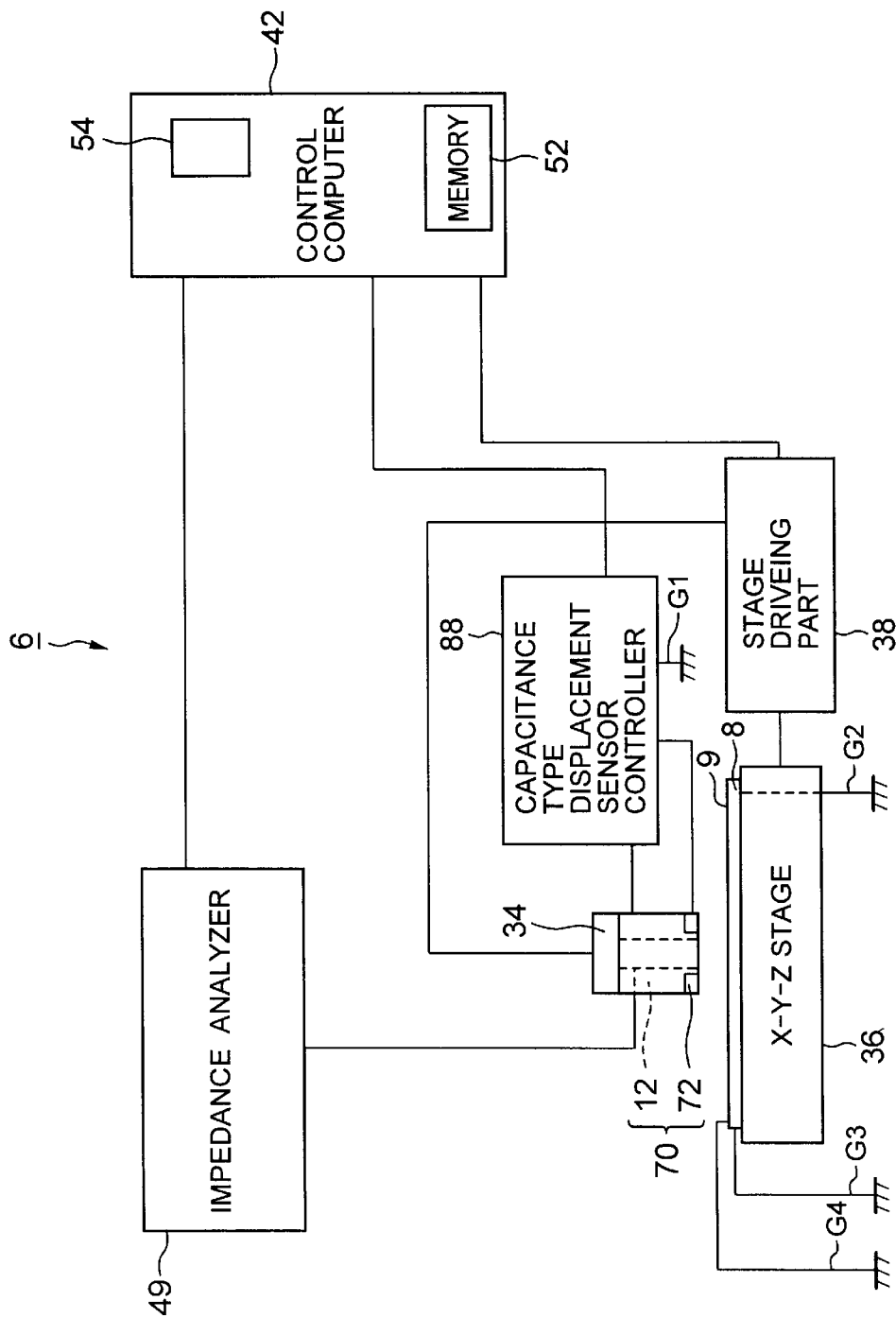
FIG. 19 is a block diagram schematically showing the construction of the eighth preferred embodiment of a thickness measuring system according to the present invention.
Figure 20A:
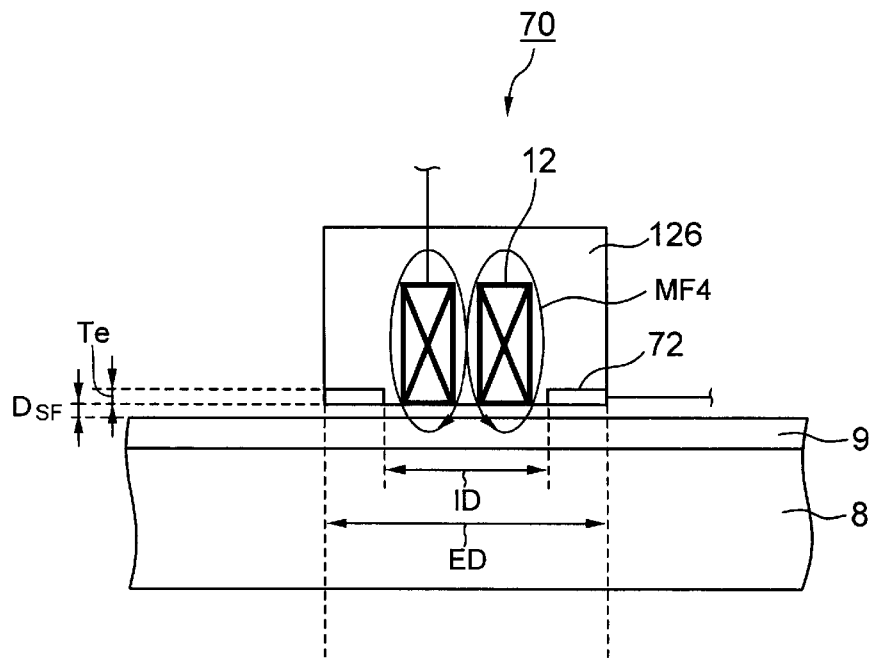
FIGS. 20A and 20B are sectional and bottom views showing the detailed construction of an eddy current loss measuring sensor unit shown in FIG. 19.
Figure 20B:
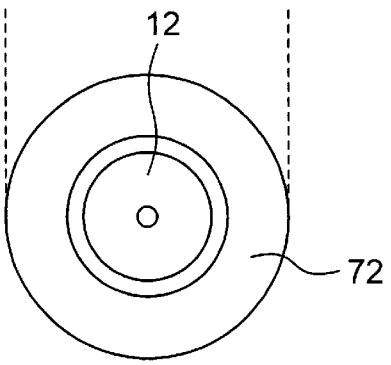

Referring to FIGS. 19, 20A and 20B, the eighth preferred embodiment of a thickness measuring system according to the present invention will be described below. This preferred embodiment is characterized in that a capacitance type displacement sensor is provided in place of the above described optical displacement sensor or laser displacement sensor to measure the distance between a sensor unit and a conductive film.

FIG. 19 is a block diagram schematically showing the construction of the thickness measuring system in this preferred embodiment. The thickness measuring system 6 shown in this figure comprises an X-Y-Z stage 36, a stage driving part 38, an impedance analyzer 49 and a control computer 42, similar to the above described second through seventh preferred embodiments, and further comprises an eddy current loss measuring sensor unit 70 and capacitance type displacement sensor controller 88, by which this preferred embodiment is characterized.

The eddy current loss measuring sensor unit 70 includes an exciting/receiving coil 12 serving as an eddy current loss measuring sensor, an insulating member 126 formed so as to cover the exciting/receiving coil 12, and a capacitance type displacement sensor electrode 72. The coil 12 is designed to receive a high frequency current from the impedance analyzer 49 to form a high frequency magnetic field to locally generate an eddy current in a conductive film 9, and to receive a synthetic magnetic field of a magnetic field generated by the eddy current and a magnetic field generated by the coil 12.

The capacitance type displacement sensor controller 88 is connected to the capacitance type displacement sensor electrode 72 arranged in the eddy current loss measuring sensor unit 70, and is grounded by a wiring G1. The side of a wafer 8 is grounded by a wiring G3. Thus, the conductive film 9 is held at a ground potential. As a result, the capacitance type displacement sensor electrode 72 and the conductive film 9 serve as both sides of a condenser, and the capacitance type displacement sensor controller 88 measures an electrostatic capacity between the capacitance type displacement sensor electrode 72 and the conductive film 9 to supply the measured result to the control computer 42. The control computer 42 is designed to calculate the distance between the capacitance type displacement sensor electrode 72 and the conductive film 9 from the measured result of the capacitance type displacement sensor controller 88. Furthermore, as shown in FIG. 19, in place of the fact that the side of the wafer 8 is grounded, a portion of the surface region of the conductive film 9 which has no influence on the thickness measurement, e.g., an end portion thereof, may be grounded via a wiring G4, or the reverse face of the end portion may be grounded by means of a wiring G2 which passes through the X-Y-Z stage 36. While the wires G2 through G4 for holding the potential of the conductive film 9 at the ground potential are shown in FIG. 19, these wires may be suitably selected in accordance with measurement environment. For example, if it is selected that the conductive film 9 is directly grounded, it is possible to carry out the measurement even if the X-Y-Z stage 36 can not be utilized, e.g., while the wafer 8 is carried.

Referring to FIGS. 20A and 20B, the detailed construction of the capacitance type displacement sensor electrode 72 will be described below.

FIG. 20A is a schematic sectional view of the eddy current loss measuring sensor unit 70 shown in FIG. 19, and FIG. 20B is a bottom view of the eddy current loss measuring sensor unit 70. The capacitance displacement sensor electrode 72 is a ring-shaped thin-film electrode of a high resistance material having a thickness Te, and is provided on the bottom of an insulating member 126 so as to surround the exciting/receiving coil 12. In this preferred embodiment, the central axis of the ring shape of the capacitance displacement sensor electrode 72 is coincident with the central axis of the coil 12. The thickness Te of the sensor electrode 72 is in the range of from about 10 $\mu$m to about 50 $\mu$m in this preferred embodiment. In the peripheral portion of the bottom of the insulating member, there is formed a recessed portion having a depth according to the thickness Te of the sensor electrode 72. The sensor electrode 72 engages the recessed portion so that its surface is arranged on the same plane as that of the bottom face of the coil 12. Thus, the distance measured by the capacitance type displacement sensor is coincident with the distance $D_{SF}$ between the coil 12 and the conductive film 9.

The external diameter ED of the capacitance type displacement sensor electrode 72 is selected so as to be substantially the same as the diameter of a region in which an eddy current is excited by the coil 12. Thus, since the electrostatic capacitance value detected by the sensor electrode 72 is equalized over the whole region in which the eddy current loss is measured, the measurement precision of the distance $D_{SF}$ between the coil 12 and the conductive film 9 is improved, so that the precision of the thickness measurement is also improved. In this preferred embodiment, the external diameter ED is in the range of from about 6 mm to about 16 mm. The internal diameter ID of the capacitance type displacement sensor electrode 72 is selected so that the inner peripheral surface of the electrode 72 is sufficiently spaced from the outer peripheral surface of the coil 12 to prevent the high frequency magnetic field excited by the coil 12 from influencing the measurement precision of the electrostatic capacity and so that the surface area of the electrode is sufficiently large in the measurement of the electrostatic capacity. In this preferred embodiment, the distance between the outer peripheral surface of the coil 12 and the inner peripheral surface of the electrode 72 is in the range of from about 1 mm to about 2 mm. Furthermore, while the insulating material has also been filled in the core of the coil 12 of the eddy current loss measuring sensor unit 70 in this preferred embodiment to constitute a part of the insulating member 126, the eddy current loss measuring sensor unit 70 may have an air-cored structure similar to the eddy current loss measuring sensor unit 60 shown in FIG. 16.

Although a thickness measuring method using the thickness measuring system 6 in this preferred embodiment is substantially the same as the first and second measuring methods described in the first through sixth preferred embodiments, this preferred embodiment is characterized in that it is possible to simultaneously carry out the measurement of an eddy current loss and the measurement of the distance $D_{SF}$ between the coil 12 and the conductive film 9. Therefore, it is possible to greatly reduce the measurement errors of the distance DSF between the coil 12 and the conductive film 9 due to the vibration of the X-Y-Z stage 36 and the vibration of the eddy current loss measuring sensor unit 70. As a result, it is possible to realize a precise and rapid thickness measurement, so that it is possible to further improve the throughput in measurement. In addition, since the number of movements of the stage decreases, it is possible to lighten the burden imposed on the performance of the stage, so that it is possible to further miniaturize and simplify the thickness measuring system. Moreover, since the distance $D_{SF}$ between the coil 12 and the conductive film 9 is measured using the electrostatic capacity, there is no influence on the reflectance and roughness of the surface of the conductive film 9. Thus, the distance between the coil 12 and a conductive film formed on an LSI pattern can also be precisely measured.

(i) Ninth Preferred Embodiment of Thickness Measuring System

Figure 21A:
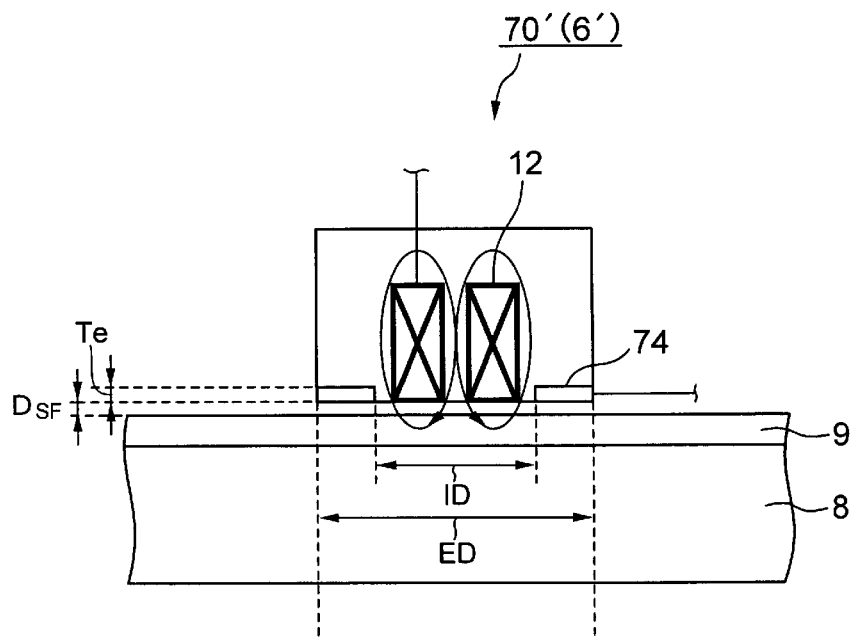
FIGS. 21A and 21B are sectional and bottom views showing the detailed construction of an eddy current loss measuring sensor unit of the ninth preferred embodiment of a thickness measuring system according to the present invention.
Figure 21B:
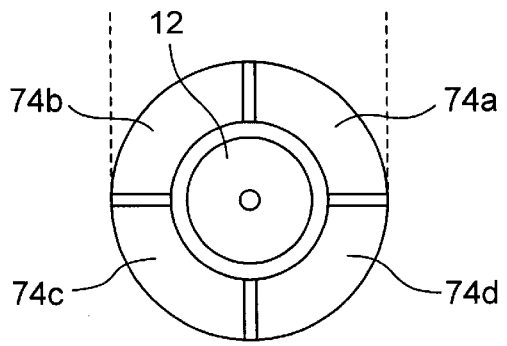

Referring to FIGS. 21A and 21B, the ninth preferred embodiment of a thickness measuring system according to the present invention will be described below. The thickness measuring system 6' in this preferred embodiment is characterized by the shape of a capacitance type displacement sensor electrode 74 of an eddy current loss measuring sensor unit 70'. Since other constructions of the thickness measuring system 6' are the same as those of the thickness measuring system 6 shown in FIG. 20, only different points will be described below.

FIG. 21A is a schematic sectional view of the eddy current loss measuring sensor unit 70' of the thickness measuring system 6' in this preferred embodiment, and FIG. 20B is a bottom view of the eddy current loss measuring sensor unit 70'. As shown in FIG. 20B, the capacitance type displacement sensor electrode 74 provided in the eddy current loss measuring sensor unit 70' comprises four circular-arc electrode pieces 74a through 74d which are associated with each other to form a ring surrounding the coil 12.

According to this preferred embodiment, the plurality of electrode pieces constitute a sensor electrode, so that it is possible to prevent an eddy current from being generated by the magnetic field excited by the coil 12. Thus, it is possible to further improve the precision in the thickness measurement.

Since a thickness measuring method using the thickness measuring system 6' in this preferred embodiment is the same as that in the above described eighth preferred embodiment, the description thereof is omitted.

(j) Tenth Preferred Embodiment of Thickness Measuring System

Figures 22A, 22B:
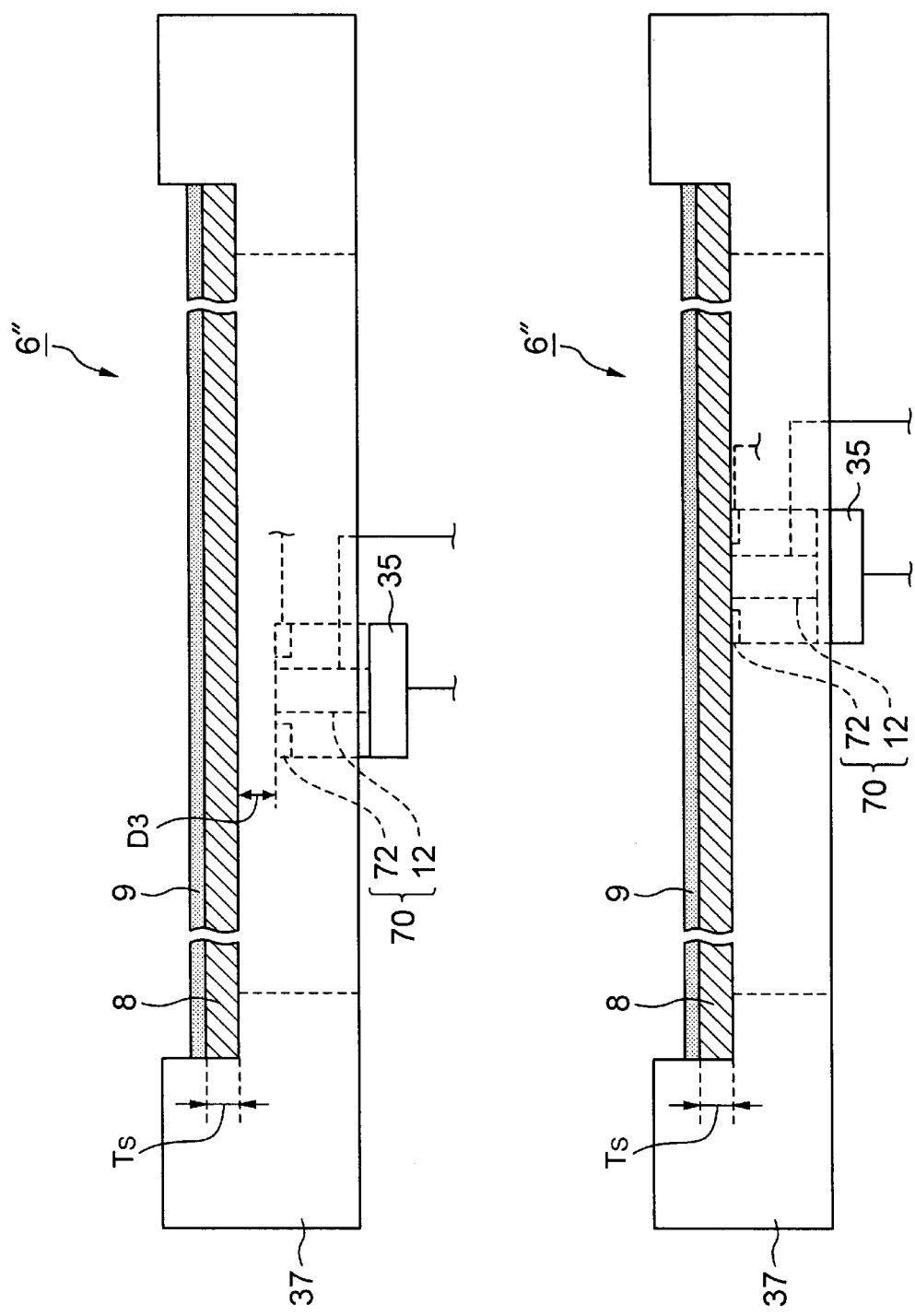
FIGS. 22A and 22B are schematic diagrams showing a principal part of the tenth preferred embodiment of a thickness measuring system according to the present invention.
Figure 23:
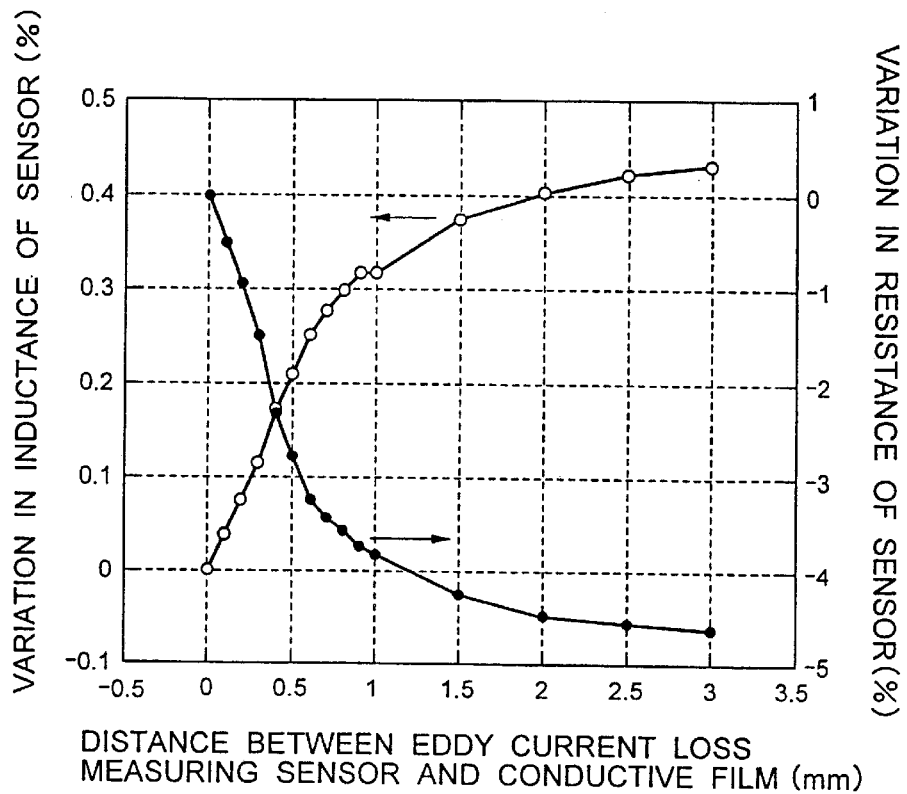
FIG. 23 is a graph for explaining an example of a conventional thickness measuring method.
Figure 24:
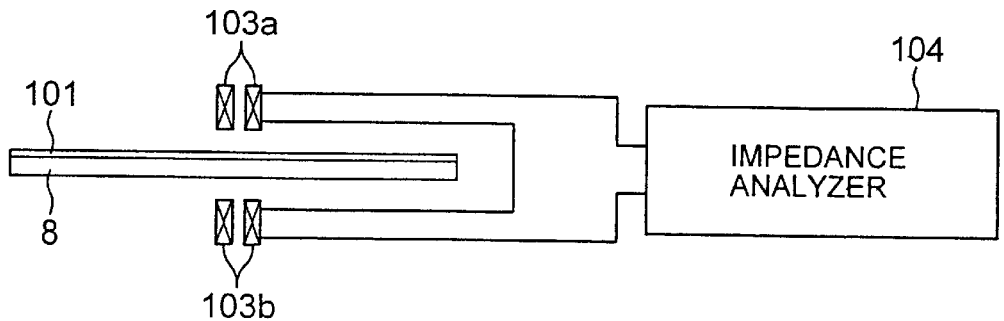
FIG. 24 is a block diagram for explaining another example of a conventional thickness measuring method.
Figure 25A:
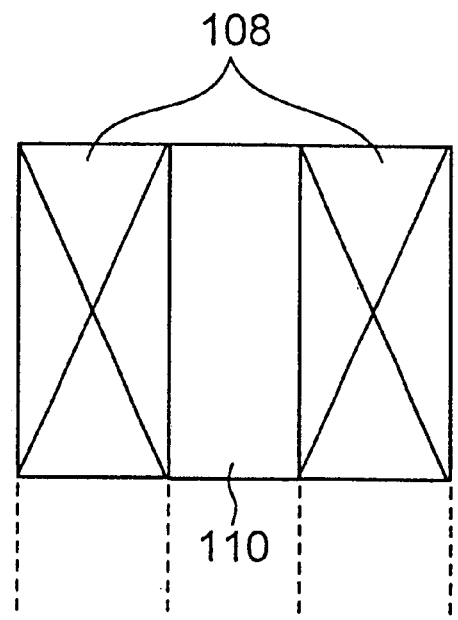
FIGS. 25A and 25B are sectional and bottom views showing an example of a convention 1 eddy current sensor.
Figure 25B:
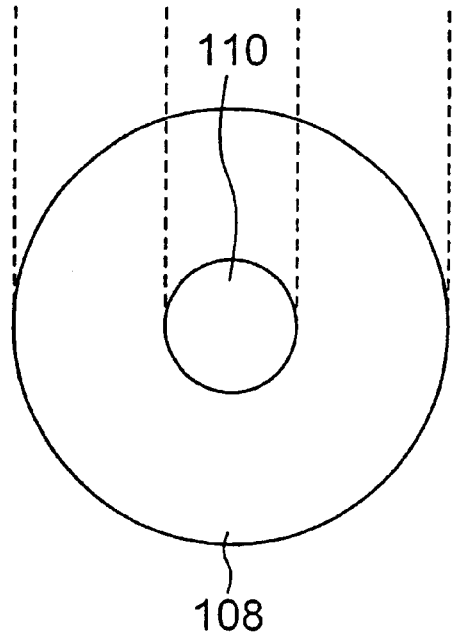
Figure 26A:
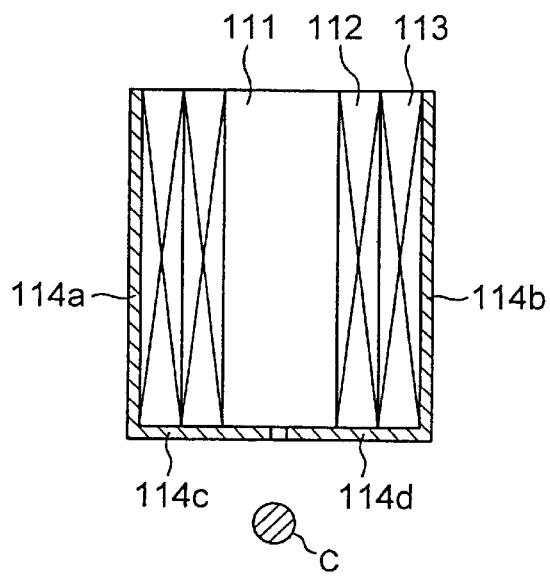
FIGS. 26A through 26D are illustration showing an example of a conventional displacement sensor.
Figure 26B:
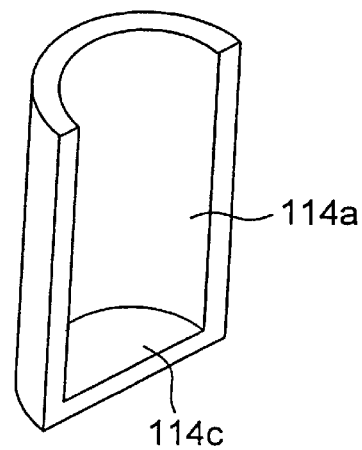
Figure 26C:
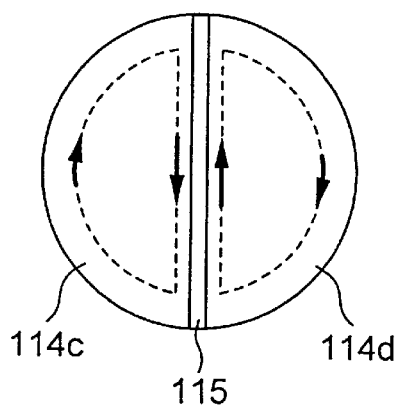
Figure 26D:
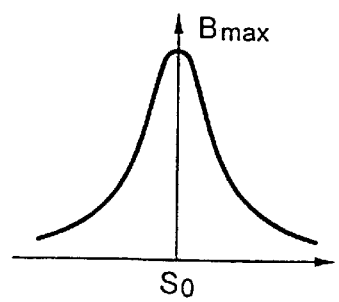

Referring to FIGS. 22A and 22B, the tenth preferred embodiment of a thickness measuring system according to the present invention will be described below.

In this preferred embodiment, the eddy current loss measuring sensor unit 70 of the thickness measuring system 6 shown in FIG. 19 is arranged on the reverse side of the conductive film 9.

FIGS. 22A and 22B are schematic diagrams showing a principal part of the thickness measuring system in this preferred embodiment. As shown in FIG. 22A, the thickness measuring system 6" in this preferred embodiment comprises an eddy current loss measuring sensor unit 70 arranged on the reverse side of a semiconductor wafer 8, i.e., on the opposite side to a surface in which the conductive film 9 is deposited, and a Z stage 35 for supporting the sensor unit on the top face thereof. Similar to the fourth preferred embodiment shown in FIG. 13A, the thickness measuring system 6" further comprises an X-Y-Z stage 37 for supporting thereon the peripheral portion of the semiconductor wafer 8, in place of the X-Y-Z stage 36. Other constructions of the thickness measuring system 6" are substantially the same as those of the thickness measuring system 6 shown in FIG. 19. The detailed measuring method using the thickness measuring system 6" is substantially the same as the above described method in the ninth preferred embodiment.

With this construction, the thickness measuring system 6" in this preferred embodiment is designed to excite a high frequency magnetic field by an exciting/receiving coil 12, which is arranged on the reverse side of the wafer 8, to generate an eddy current in the conductive film 9 via the wafer 8 to detect a synthetic field, which is varied by the generated eddy current to measure the thickness of the conductive film 9. The distance $D_{SF}$ between the sensor unit and the conductive film can be easily calculated from a distance (D3+Ts) if the distance D3 between the reverse of the wafer 8 and the eddy current loss measuring sensor unit 60 and the thickness Ts of the wafer 8 are previously obtained.

For example, as shown in FIG. 22B, the measurement may be carried out while the top face of the eddy current loss measuring sensor unit 70 contacts the reverse face of the wafer 8.

Thus, according to the thickness measuring system 6" in this preferred embodiment, the eddy current loss measuring sensor unit 70 is arranged on the reverse side of the wafer 8, so that it is possible to eliminate the possibility of preventing the conductive film 9, which is deposited on the wafer 8, from being deposited during the deposition and etching processes. Moreover, during the CMP process, it is not required to measure the thickness while avoiding contacting a polishing tool. Thus, constraints on measurement are greatly reduced, so that the thickness measuring system 6" in this preferred embodiment can be operated as an in-situ type thickness measuring system. Thus, according to this preferred embodiment, it is possible to provide a thickness measuring system which has an excellent degree of freedom of design, an excellent measurement precision and an excellent throughput.

While the eddy current loss measuring sensor unit 70 has been arranged only on the reverse side of the wafer in this preferred embodiment, the eddy current loss measuring sensor unit 70 may be arranged above the conductive film 9 in addition to the sensor unit 70 arranged on the reverse side of the conductive film 9 to measure a thickness from both sides similar to the fourth preferred embodiment shown in FIGS. 13A and 13B.

(3) Recorded Medium

The above described series of measuring procedures including the first through third measuring methods may be stored in a recordable medium, such as a flexible disk or a CD-ROM, as a program, which is to be executed by a computer, to be read and executed by the computer. Thus, the above described thickness measuring method can be realized using a thickness measuring system with a displacement sensor and a general purpose control computer. The recorded medium should not be limited to a portable recorded medium such as a magnetic disk and an optical disk, but the recorded media may be a fixed recorded medium such as a hard disk drive and a memory. A program in which a series of procedures of the above described thickness measuring method have been incorporated may be distributed via communication lines (including radio communication), such as Internet. Moreover, a program in which a series of procedures of the above described thickness measuring method have been incorporated may be enciphered, modulated or compressed to be distributed via a wire circuit or radio circuit, such as Internet, or to be stored in a recordable medium to be distributed.

While the preferred embodiments of the present invention have been described, the present invention should not be limited to the above described preferred embodiments, but the invention may be modified in various ways without departing from the principle of the invention. For example, while the thickness measuring system in the above described preferred embodiments has used the eddy current loss measuring sensor 20 in the fourth preferred embodiment, the current loss measuring sensor 10 shown in FIG. 1 or the current loss measuring sensor 120 shown in FIG. 12 may be used. Similarly, while the current loss measuring sensor 10 has been used in the fifth preferred embodiment, the current loss measuring sensor shown in FIG. 2 or the current loss measuring sensor 120 shown in FIG. 12 may be used. Alternatively, the current loss measuring sensors in these three embodiments may be suitably combined in the same system. Moreover, while the eddy current loss measuring sensor unit having the exciting/receiving coil has been described in the sixth through tenth preferred embodiments, it is clear that the system may be applied to an eddy current loss measuring sensor unit having an eddy current exciting coil and a receiving coil. In addition, while the single eddy current loss measuring sensor unit has been provided in the sixth through tenth preferred embodiments, a plurality of sensor units may be arranged as shown in FIGS. 14A through 14D.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention according to the appended claims.

What is claimed is:

1. An eddy current loss measuring sensor comprising:

an exciting/receiving coil for receiving a high frequency current to excite a high frequency magnetic field to excite an eddy current in a conductive film which is an to be measured, and for receiving a synthetic magnetic field of a magnetic field generated by said eddy current and said high frequency magnetic field;

a first magnetic permeable member inserted into said exciting/receiving coil to serve as a core, said first magnetic permeable member being formed of a first magnetic permeable material; and a second magnetic permeable member provided so as to surround said first permeable member and said exciting/receiving coil, said second magnetic permeable member being formed of a second magnetic permeable material and having a surface facing said conductive film, said surface being provided with a ring shaped opening around said first magnetic member so that only a portion of said exciting/receiving coil facing said conductive film is exposed and a remaining portion of said exciting/receiving coil facing said conductive film is covered by said second magnetic permeable member.

2. An eddy current loss measuring sensor according to claim 1, wherein an inside wall of said opening corresponding to a part of a surface of said first magnetic member, the distance between the inside and outside walls of said opening being adjusted so that a magnetic flux from said first magnetic permeable member passes through only a localized region of said conductive film facing said exciting/receiving coil.

3. An eddy current loss measuring sensor according to claim 2, wherein a surface portion of said opening, or a surface portion of said opening and a surface portion of a region near said opening are formed of a third magnetic permeable material having a higher magnetic permeability than that of said second magnetic permeable material.

4. An eddy current loss measuring sensor comprising:

an eddy current exciting coil for receiving a high frequency current to excite a high frequency magnetic field to excite an eddy current in a conductive film serving as an object to be measured;

a receiving coil provided so as to be wound by said eddy current exciting coil for receiving a synthetic magnetic field of a magnetic field generated by said eddy current and said high frequency magnetic field;

a first magnetic permeable member inserted into said receiving coil to serve as a core; and a second magnetic permeable member provided so as to surround said first permeable member, said receiving coil and said eddy current exciting coil, said first magnetic permeable member being formed of a first magnetic permeable material, said second magnetic permeable member being formed of a second magnetic permeable material, and said second magnetic permeable member having a surface facing said conductive film, said surface being provided with a ring shaped opening around said first magnetic member so that only a portion of said receiving coil facing said conductive film is exposed and a remaining portion of said receiving coil facing said conductive film and a portion of said exciting coil facing said conductive film are covered by said second magnetic permeable member.

5. An eddy current loss measuring sensor according to claim 4, wherein an inside wall of said opening corresponding to a part of a surface of said first magnetic member, the distance between the inside and outside walls of said opening being adjusted so that a magnetic flux from said first magnetic permeable member passes through a localized region of said conductive film facing said receiving coil and said exciting coil.

6. An eddy current loss measuring sensor according to claim 5, wherein a surface portion of said opening, or a surface portion of said opening and a surface portion of a region near said opening are formed of a third magnetic permeable material having a higher magnetic permeability than that of said second magnetic permeable material.

7. A thickness measuring system comprising:
an eddy current loss measuring sensor including an eddy current exciting/receiving coil for receiving a high frequency current to excite a high frequency magnetic field to excite an eddy current in a conductive film serving as an object to be measured, and for receiving a synthetic magnetic field of a magnetic field generated by said eddy current and said high frequency magnetic field, to output said high frequency current which is influenced by an eddy current loss caused by said eddy current, said an eddy current loss measuring sensor further including a first magnetic permeable member inserted into said exciting/receiving coil to serve as a core, and a second magnetic permeable member provided so as to surround said first permeable member and said exciting/receiving coil;
an eddy current loss measuring part for detecting said high frequency current, which is outputted from said eddy current loss measuring sensor, to measure the variation in impedance of said eddy current loss measuring sensor, the variation in current value of said high frequency current or the variation in phase of said high frequency current to output the measured variation as data indicative of the magnitude of said eddy current loss;
a distance measuring part for measuring the distance between said conductive film and said eddy current loss measuring sensor;
memory for storing therein a measuring data indicative of a correlation between said distance between said eddy current loss measuring sensor and said conductive film, the frequency of said high frequency current, the thickness of said conductive film, the specific resistance of said conductive film, and the variation in impedance of said eddy current loss measuring sensor, or a correlation between said distance, said frequency, said thickness and said specific resistance, and the variation in current value of said high frequency current, or a correlation between said distance, said frequency, said thickness, said specific resistance, and the variation in phase of said high frequency current; and
a thickness operation part for calculating the thickness of said conductive film by comparing the measured variation in impedance of said eddy current loss measuring sensor, the measured variation in current value of said high frequency current, or the measured variation in phase of said high frequency current, with said measuring data stored in said memory;
wherein said first magnetic permeable member is formed of a first magnetic permeable material, said second magnetic permeable member is formed of a second magnetic permeable material and has a surface facing said conductive film, and said surface facing said conductive film is provided with a ring shaped opening around said first magnetic member so that only a portion of said exciting/receiving coil facing said conductive film is exposed and a remaining portion of said exciting/receiving coil facing said conductive film is covered by said second magnetic permeable member.

8. A thickness measuring system according to claim 7, wherein an inside wall of said opening corresponds to a part of a surface of said first magnetic member, the distance between the inside and outside walls of said opening is adjusted so that a magnetic flux from said first magnetic permeable member passes through only a localized region of said conductive film facing said exciting/receiving coil.

9. A thickness measuring system according to claim 7, wherein a surface portion of said opening, or a surface portion of said opening and a surface portion of a region near said opening are formed of a third magnetic permeable material having a higher magnetic permeability that that of said second magnetic permeable material.

10. A thickness measuring system comprising:
eddy current loss measuring sensor including an eddy current exciting coil for receiving a high frequency current to excite a high frequency magnetic field to excite an eddy current in a conductive film serving as an object to be measured, and a receiving coil provided so as to be wound by said eddy current exciting coil for receiving a synthetic magnetic field of a magnetic field generated by said eddy current and said high frequency magnetic field, to output said high frequency current which is influenced by an eddy current loss caused by said eddy current, said an eddy current loss measuring sensor further including a first magnetic permeable member inserted into said receiving coil to serve as a core, a second magnetic permeable member provided so as to surround said first permeable member, said receiving coil and said eddy current exciting coil;
an eddy current loss measuring part for detecting said high frequency current, which is outputted from said eddy current loss measuring sensor, to measure the variation in impedance of said eddy current loss measuring sensor, the variation in current value of said high frequency current or the variation in phase of said high frequency current to output the measured variation as data indicative of the magnitude of said eddy current loss;
a distance measuring part for measuring the distance between said conductive film and said eddy current loss measuring sensor;
a memory for storing therein a measuring data indicative of a correlation between said distance between said eddy current loss measuring sensor and said conductive film, the frequency of said high frequency current, the thickness of said conductive film, the specific resistance of said conductive film, and the variation in impedance of said eddy current loss measuring sensor, or a correlation between said distance, said frequency, said thickness and said specific resistance, and the variation in current value of said high frequency current, or a correlation between said distance, said frequency, said thickness, said specific resistance, and the variation in phase of said high frequency current; and
a thickness operation part for calculating the thickness of said conductive film by comparing the measured variation in impedance of said eddy current loss measuring sensor, the measured variation in current value of said high frequency current or the measured variation in phase of said high frequency current, with said measuring data stored in said memory;

wherein said first magnetic permeable member is formed of a first magnetic permeable material, said second magnetic permeable member is formed of a second magnetic permeable material and has a surface facing said conductive film, and said surface facing said conductive film is provided with a ring shaped opening around said first magnetic member so that only a portion of said receiving coil facing said conductive film is exposed and a remaining portion of said receiving coil facing said conductive film and a portion of said exciting coil facing said conductive film are covered by said second magnetic permeable member.

11. A thickness measuring system according to claim 10, wherein an inside wall of said opening corresponds to a part of a surface of said first magnetic member, the distance between the inside and outside walls of said opening is adjusted so that a magnetic flux from said first magnetic permeable member passes through only a localized region of said conductive film facing said receiving coil and said exciting coil.

12. A thickness measuring system according to claim 10, wherein a surface portion of said opening, or a surface portion of said opening and a surface portion of a region near said opening are formed of a third magnetic permeable material having a higher magnetic permeability than that of said second magnetic permeable material.

13. A thickness measuring system comprising:

an eddy current loss measuring sensor including an exciting/receiving air-cored coil for receiving a high frequency current to excite a high frequency magnetic field to excite an eddy current in a conductive film serving as an object to be measured, and for receiving a synthetic magnetic field of a magnetic field generated by said eddy current and said high frequency magnetic field, to output said high frequency current which is influenced by an eddy current loss caused by said eddy current;

a stage for supporting thereon a substrate on which said conductive film is deposited;

an eddy current loss measuring part for detecting said high frequency current, which is outputted from said eddy current loss measuring sensor, to measure the variation in impedance of said eddy current loss measuring sensor, the variation in current value of said high frequency current or the variation in phase of said high frequency current, to output the measured variation as data indicative of the magnitude of said eddy current loss;

a distance measuring part for measuring the distance between said conductive film and said eddy current loss measuring sensor, said distance measuring part including a laser displacement sensor provided above said air-cored coil for emitting a laser beam to cause the laser beam to be incident on the surface of said conductive film via an air-core of said air-cored coil and for receiving light via said air-core, the light being reflected on said conductive film;

a memory for storing therein a measuring data indicative of a correlation between said distance between said eddy current loss measuring sensor and said conductive film, the frequency of said high frequency current, the thickness of said conductive film, the specific resistance of said conductive film, and the variation in impedance of said eddy current loss measuring sensor, or a correlation between said distance, said frequency, said thickness and said specific resistance, and the variation in current value of said high frequency current, or a correlation between said distance, said frequency, said thickness, said specific resistance, and the variation in phase of said high frequency current;

a thickness operation part for calculating the thickness of said conductive film by comparing the measured variation in impedance of said eddy current loss measuring sensor, the measured variation in current value of said high frequency current or the measured variation in phase of said high frequency current, with said measuring data stored in said memory; and a distance measurement error correcting part for driving said laser displacement sensor to measure said distance, and for providing a control part for controlling said stage and said eddy current loss measuring sensor in response to said distance measurement error correcting part in order to maintain a substantially constant distance between said eddy current loss measuring sensor and said conductive film.

14. A thickness measuring system comprising:

an eddy current loss measuring sensor including an exciting/receiving air-cored coil for receiving a high frequency current to excite a high frequency magnetic field to excite an eddy current in a conductive film serving as an object to be measured, and for receiving a synthetic magnetic field of a magnetic field generated by said eddy current and said high frequency magnetic field, to output said high frequency current which is influenced by an eddy current loss caused by said eddy current;

an eddy current loss measuring part for detecting said high frequency current, which is outputted from said eddy current loss measuring sensor, to measure the variation in impedance of said eddy current loss measuring sensor, the variation in current value of said high frequency current or the variation in phase of said high frequency current, to output the measured variation as data indicative of the magnitude of said eddy current loss;

a distance measuring part for measuring the distance between said conductive film and said eddy current loss measuring sensor, said distance measuring part including a laser displacement sensor provided above said air-cored coil for emitting a laser beam to cause the laser beam to be incident on the surface of said conductive film via an air-core of said air-cored coil and for receiving light via said air-core, the light being reflected on said conductive film;

a memory for storing therein a measuring data indicative of a correlation between said distance between said eddy current loss measuring sensor and said conductive film, the frequency of said high frequency current, the thickness of said conductive film, the specific resistance of said conductive film, and the variation in impedance of said eddy current loss measuring sensor, or a correlation between said distance, said frequency, said thickness and said specific resistance, and the variation in current value of said high frequency current, or a correlation between said distance, said frequency, said thickness, said specific resistance, and the variation in phase of said high frequency current;

a thickness operation part for calculating the thickness of said conductive film by comparing the measured variation in impedance of said eddy current loss measuring sensor, the measured variation in current value of said high frequency current or the measured variation in phase of said high frequency current, with said measuring data stored in said memory; and a distance measurement error correcting part for driving said laser displacement sensor to measure said distance prior to the measurement of the thickness of said conductive film, and for correcting a measurement error of the measured distance;

wherein said thickness operation part corrects the calculated thickness value on the basis of the measured distance corrected by said distance measurement error correcting part.

15. A thickness measuring system comprising:

an eddy current loss measuring sensor including an eddy current exciting coil for receiving a high frequency current to excite a high frequency magnetic field to excite an eddy current in a conductive film which is an object to be measured, and an air-coiled receiving coil, provided so as to be wound by said eddy current exciting coil, for receiving a synthetic magnetic field of a magnetic field generated by said eddy current and said high frequency magnetic field, to output said high frequency current which is influenced by an eddy current loss caused by said eddy current;

an eddy current loss measuring part for detecting said high frequency current, which is outputted from said eddy current loss measuring sensor, to measure the variation in impedance of said eddy current loss measuring sensor, the variation in current value of said high frequency current or the variation in phase of said high frequency current, to output the measured variation as data indicative of the magnitude of said eddy current loss;

a distance measuring part for measuring the distance between said conductive film and said eddy current loss measuring sensor, said distance measuring part including a laser displacement sensor provided above said air-cored coil for emitting a laser beam to cause the laser beam to be incident on the surface of said conductive film via an air-core of said air-cored coil and for receiving light via said air-core, the light being reflected on said conductive film;

a memory for storing therein a measuring data indicative of a correlation between said distance between said eddy current loss measuring sensor and said conductive film, the frequency of said high frequency current, the thickness of said conductive film, the specific resistance of said conductive film, and the variation in impedance of said eddy current loss measuring sensor, or a correlation between said distance, said frequency, said thickness and said specific resistance, and the variation in current value of said high frequency current, or a correlation between said distance, said frequency, said thickness, said specific resistance, and the variation in phase of said high frequency current; and a thickness operation part for calculating the thickness of said conductive film by comparing the measured variation in impedance of said eddy current loss measuring sensor, the measured variation in current value of said high frequency current or the measured variation in phase of said high frequency current, with said measuring data stored in said memory.

16. A thickness measuring system according to claim 15, which further comprises a distance measurement error correcting part for driving said laser displacement sensor to measure said distance prior to the measurement of the thickness of said conductive film, and for correcting a measurement error of the measured result, wherein said control part controls said stage moving part and said sensor moving part on the basis of the measured distance, which is corrected by said distance measurement error correcting part, so that said eddy current loss measuring sensor scans on said conductive film while holding a substantially constant distance between said eddy current loss measuring sensor and said conductive film.

17. A thickness measuring system according to claim 15, which further comprises a distance measurement error correcting part for driving said laser displacement sensor to measure said distance prior to the measurement of the thickness of said conductive film, and for correcting a measurement error of the measured result, wherein said thickness operation part corrects the calculated thickness value on the basis of the measured distance corrected by said distance measurement error correcting part.

18. A thickness measuring system comprising:

an eddy current loss measuring sensor for receiving said high frequency current to excite a high frequency magnetic field to excite an eddy current in a conductive film which is an object to be measured, and for receiving a synthetic magnetic field of a magnetic field generated by said eddy current and said high frequency magnetic field, to output said high frequency current which is influenced by an eddy current loss caused by said eddy current;

an eddy current loss measuring part for detecting said high frequency current, which is outputted from said eddy current loss measuring sensor, to measure the variation in impedance of said eddy current loss measuring sensor, the variation in current value of said high frequency current or the variation in phase of said high frequency current to output the measured variation as data indicative of the magnitude of said eddy current loss;

a distance measuring part for measuring the distance between said conductive film and said eddy current loss measuring sensor, said distance measuring part including a capacitance type displacement sensor having a measuring electrode provided in the vicinity of said eddy current loss measuring sensor for measuring said distance on the basis of an electrostatic capacity between said electrode and said conductive film;

a memory for storing therein a measuring data indicative of a correlation between said distance between said eddy current loss measuring sensor and said conductive film, the frequency of said high frequency current, the thickness of said conductive film, the specific resistance of said conductive film, and the variation in impedance of said eddy current loss measuring sensor, or a correlation between said distance, said frequency, said thickness and said specific resistance, and the variation in current value of said high frequency current, or a correlation between said distance, said frequency, said thickness, said specific resistance, and the variation in phase of said high frequency current; and a thickness operation part for calculating the thickness of said conductive film by comparing the measured variation in impedance of said eddy current loss measuring sensor, the measured variation in current value of said high frequency current or the measured variation in phase of said high frequency current, with said measuring data stored in said memory;

wherein said measuring electrode is provided so that the bottom face of said measuring electrode is substantially arranged on the same plane of the bottom face of said eddy current loss measuring sensor.

19. A thickness measuring system according to claim 18, wherein said measuring electrode is a thin film electrode of a high resistance material.

20. A thickness measuring system according to claim 19, wherein said measuring electrode has a plurality of electrode pieces.

21. A thickness measuring system according to claim 20, wherein said measuring electrode has a ring shape surrounding said eddy current loss measuring sensor.

22. A thickness measuring system according to claim 21, wherein the external diameter of said measuring electrode is substantially the same as the diameter of a region in which an eddy current loss is generated by the eddy current excited in said conductive film by said eddy current loss measuring sensor.

23. A thickness measuring system according to claim 22, wherein the internal diameter of said measuring electrode is selected so that the eddy current excited in said measuring electrode by said eddy current loss measuring sensor is small so as to be capable of being ignored in measurement and so that said measuring electrode has a surface area so as to be capable of measuring said electrostatic capacity between said measuring electrode and said conductive film.

24. A thickness measuring method using a thickness measuring system having an eddy current loss measuring sensor for exciting a high frequency magnetic field to excite an eddy current in a conductive film, which is an object to be measured, and for detecting an eddy current loss caused by the eddy current, and a distance measuring part, said method comprising:

a distance measuring step of measuring the distance between said eddy current loss measuring sensor and said conductive film by means of said distance measuring part;

an eddy current loss measuring step of supplying a high frequency current to said eddy current loss measuring sensor to excite said high frequency magnetic field to excite an eddy current in said conductive film to measure the variation in impedance of said eddy current loss measuring sensor, the variation in current value of said high frequency current or the variation in phase of said high frequency current on the basis of said high frequency current outputted from said eddy current loss measuring sensor; and a first calculating step of calculating the thickness of said conductive film on the basis of said variation in impedance and said distance between said eddy current loss measuring sensor and said conductive film, or said variation in current value of said high frequency current and said distance between said eddy current loss measuring sensor and said conductive film, or said variation in phase of said high frequency current and said distance between said eddy current loss measuring sensor and said conductive film; and a first correcting step of correcting the thickness value, the thickness value being obtained at said first calculating step, on the basis of the relationship between said distance and said impedance, or the relationship between said distance and said current value of said high frequency current, or the relationship between said distance and said phase of said high frequency current.

25. A thickness measuring method according to claim 24, wherein said distance measuring part includes an optical displacement sensor, and which further comprises a distance measurement error correcting step of driving said optical displacement sensor to measure said distance prior to the measurement of the thickness of said conductive film and of correcting a measurement error of the measure result, said thickness calculating step including a step of correcting the calculated thickness value on the basis of the measured distance corrected at said distance measurement error correcting step.

26. A thickness measuring method according to claim 24, wherein said eddy current measuring sensor includes an air cored coil, said distance measuring part includes a laser displacement laser, provided above said air-cored coil, for emitting a laser beam to cause the laser beam to be incident on the surface of said conductive film via an air-core of said air-cored coil and for receiving light via said air-core, the light being reflected on the surface of said conductive film, and said distance measuring step and said eddy current loss measuring step are simultaneously carried out in parallel.

27. A thickness measuring method according to claim 24, wherein said distance measuring part includes a capacitance type displacement sensor having a measuring electrode provided in the vicinity of said eddy current loss measuring sensor for measuring said distance on the basis of an electrostatic capacity between said measuring electrode and said conductive film, and said distance measuring step and said eddy current loss measuring step are simultaneously carried out in parallel.

28. A thickness measuring method according to claim 24, which further comprises a reference value measuring step of, prior to said eddy current loss measuring step, supplying said high frequency current to said eddy current loss measuring sensor in a region which is not influenced by said eddy current loss and of measuring an impedance of said eddy current loss measuring sensor, a current value of said high frequency current or a phase of said high frequency current on the basis of said high frequency current outputted from said eddy current loss measuring sensor as a measuring reference value, said thickness calculating step including a second correcting step of correcting the value of the thickness on the basis of said measuring reference value, the value of the thickness being obtained at said first calculating step.

29. A thickness measuring method according to claim 28, wherein a reference conductive film is previously prepared in said region which is not influenced by said eddy current, the reference conductive film serving as a reference of measurement and having a predetermined thickness, and said reference value measuring step is a step of measuring said impedance of said eddy current loss measuring sensor, said current value of said high frequency current or said phase of said high frequency current as said measuring reference value, said impedance, said current value and said phase being measured in a region in which said reference conductive film is deposited.

30. A thickness measuring method according to claim 24, wherein said thickness measuring system further comprises a stage for supporting thereon a substrate on which said conductive film is deposited, and said eddy current loss measuring step includes a step of controlling a relative positional relationship between said stage and said eddy current loss measuring sensor so that said distance is substantially constant on the basis of the measured result at said distance measuring step.

31. A thickness measuring method according to claim 24, which is carried out in parallel to said deposition, etching or polishing step of said conductive film.

32. A thickness measuring method according to claim 24, which further comprises a step of controlling the frequency of said high frequency current.

33. A thickness measuring method according to claim 24, wherein said conductive film is deposited above a circuit pattern including a conductive material or an underlying conductive film, and said thickness measuring method includes a step of previously calculating a thickness value of said circuit pattern or said underlying conductive film as an underlayer thickness value, a step of calculating a total thickness value of said underlayer thickness value and the thickness value of said conductive film during or after the deposition of said conductive film, and a step of subtracting said underlayer thickness value from the calculated total thickness value.

34. A computer readable recorded medium for use in a thickness measuring system comprising an eddy current loss measuring sensor for exciting a high frequency magnetic field to excite an eddy current in a conductive film which is an object to be measured and for detecting an eddy current loss caused by the eddy current, a distance measuring part and a computer, said computer readable recorded medium including a program recorded therein for causing said computer to execute a thickness measuring method comprising:

a distance measuring step of measuring the distance between said eddy current loss measuring sensor and said conductive film by means of said distance measuring part;

an eddy current loss measuring step of supplying a high frequency current to said eddy current loss measuring sensor to excite said high frequency magnetic field to excite an eddy current in said conductive film to measure the variation in impedance of said eddy current loss measuring sensor, the variation in current value of said high frequency current or the variation in phase of said high frequency current on the basis of said high frequency current outputted from said eddy current loss measuring sensor;

a first calculating step of calculating the thickness of said conductive film on the basis of said variation in impedance and said distance between said eddy current loss measuring sensor and said conductive film, or said variation in current value of said high frequency current and said distance between said eddy current loss measuring sensor and said conductive film, or said variation in phase of said high frequency current and said distance between said eddy current loss measuring sensor and said conductive film; and a first correcting step of correcting the thickness value, the thickness value being obtained at said first calculating step, on the basis of the relationship between said distance and said impedance, or the relationship between said distance and said current value of said high frequency current, or the relationship between said distance and said phase of said high frequency current.

35. A recorded medium according to claim 34, wherein said distance measuring step and said eddy current loss measuring step are simultaneously carried out in parallel.

36. A recorded medium according to claim 34, wherein said thickness measuring method further comprises a distance measurement error correcting step of measuring said distance prior to the measurement of the thickness of said conductive film and of correcting a measurement error of the measured result, and said thickness calculating step includes a second correcting step of correcting the calculated thickness value on the basis of the measured distance corrected in said distance measurement error correcting step.

37. A thickness measuring system comprising:

an eddy current loss measuring sensor which receives a high frequency current to excite a high frequency magnetic field to excite an eddy current in a conductive film serving as an object to be measured and which outputs said high frequency current which is influenced by an eddy current loss caused by said eddy current;

a stage which supports thereon a substrate on which said conductive film is deposited;

an eddy current loss measuring part which detects said high frequency current, which is outputted from said eddy current loss measuring sensor, to measure the variation in impedance of said eddy current loss measuring sensor, the variation in current value of said high frequency current or the variation in phase of said high frequency current to output the measured variation as data indicative of the magnitude of said eddy current loss;

a distance measuring part which measures the distance between said conductive film and said eddy current loss measuring sensor;

a thickness operation part which calculates the thickness of said conductive film in accordance with a relation between the thickness of the conductive film and the, measured result of said eddy current loss measuring part; and a control part which controls a relative positional relationship between said stage and said eddy current loss measuring sensor in response to said distance measuring part in order to maintain a substantially constant distance between said eddy current loss measuring sensor and said conductive film.

38. A thickness measuring system comprising:

an eddy current loss measuring sensor which receives a high frequency current to excite a high frequency magnetic field to excite an eddy current in a conductive film serving as an object to be measured and which outputs said high frequency current which is influenced by an eddy current loss caused by said eddy current;

an eddy current loss measuring part which detects said high frequency current, which is outputted from said eddy current loss measuring sensor, to measure the variation in impedance of said eddy current loss measuring sensor, the variation in current value of said high frequency current or the variation in phase of said high frequency current, to output the measured variation as data indicative of the magnitude of said eddy current loss;

a distance measuring part for measuring the distance between said conductive film and said eddy current loss measuring sensor; and a thickness operation part which calculates the thickness of said conductive film in accordance with a relation between the thickness of the conductive film and the variation in impedance of said eddy current loss measuring part, a relation between the thickness of the conductive film and the variation in current value of said eddy current loss measuring part, or a relation between the thickness of the conductive film and the variation in phase of said eddy current loss measuring part, said thickness operation part correcting the calculated thickness in response to the measured result of said distance measuring part on the basis of a correlation between the variation in impedance of said eddy current loss measuring part and the distance between said conductive film and said eddy current loss measuring sensor, a correlation between the variation in current value of said eddy current loss measuring part and the distance between said conductive film and said eddy current loss measuring sensor, or a correlation between the variation in phase of said eddy current loss measuring part and the distance between said conductive film and said eddy current loss measuring sensor.

39. A thickness measuring system according to claim 38, which further comprises a frequency control part for controlling the frequency of said high frequency current so that the frequency of said high frequency current varies in response to a respected thickness of said conductive film on the basis of a relation between the frequency of said high frequency current, the thickness of the conductive film and the resolution of the thickness measuring system.

40. A thickness measuring system according to claim 38, wherein said stage is formed of an insulating material or a material having a small conductivity so that only a small quantity of eddy current capable of being ignored is generated in receiving said high frequency magnetic field.

41. A thickness measuring system according to claim 38, which further comprises a control part which moves said eddy current loss measuring sensor to a region where there is substantially no influence of said eddy current, said eddy current loss measuring part measures the impedance of said eddy current measuring sensor, the current value of said high frequency current or the phase of said high frequency current in said region where there is substantially no influence of said eddy current to output the measured result as a measuring reference value; and said thickness operation part further corrects the calculated thickness value on the basis of said measuring reference value.

42. A thickness measuring system according to claim 38, which further comprises a stage moving part for moving said stage and a sensor moving part for moving said eddy current loss measuring sensor, wherein said control part controls said stage moving part and/or a sensor moving part so that said conductive film is scanned with said eddy current loss measuring sensor in parallel to a deposition, etching or polishing process for said conductive film, and said thickness operation part receives the measured result of said distance measuring part to correct the calculated thickness value.

43. A thickness measuring system according to claim 38, which comprises a plurality of said eddy current loss measuring sensors.

44. A thickness measuring system according to claim 38, wherein said eddy current loss measuring sensor is provided so as to face a surface on which said conductive film serving as said object to be measured is deposited, etched or polished, or so as to face a substrate surface on the opposite side to a surface on which said conductive film serving as said object to be measured is deposited, etched or polished, or so as to face both of a surface on which said conductive film serving as said object to be measured is deposited and a substrate surface on the opposite side to the surface on which said conductive film serving as said object to be measured is deposited, etched or polished.

45. A thickness measuring system according to claim 38, wherein said thickness operation part performs calculation of the thickness of said conductive film and correction of the calculated thickness in parallel.

46. A thickness measuring system comprising:

an eddy current loss measuring sensor for receiving a high frequency current to excite a high frequency magnetic field to excite an eddy current in a conductive film serving as an object to be measured, and for outputting said high frequency current which is influenced by an eddy current loss caused by said eddy current;

a sensor moving part for moving said eddy current loss measuring sensor, an eddy current loss measuring part for detecting said high frequency current, which is outputted from said eddy current loss measuring sensor, to measure the variation in impedance of said eddy current loss measuring sensor, the variation in current value of said high frequency current or the variation in phase of said high frequency current to output the measured variation as data indicative of the magnitude of said eddy current loss;

a distance measuring part for measuring the distance between said conductive film and said eddy current loss measuring sensor;

a control part for controlling a relative positional relationship between said stage and said eddy current loss measuring sensor on the basis of the measured result of said distance measuring part, and a thickness operation part which calculates the thickness of said conductive film in accordance with a relation between the thickness of the conductive film and the variation in impedance of said eddy current loss measuring part, a relation between the thickness of the conductive film and the variation in current value of said eddy current loss measuring part, or a relation between the thickness of the conductive film and the variation in phase of said eddy current loss measuring part, wherein said control part controls said sensor moving part to drive said eddy current loss measuring sensor so that said conductive film is scanned with said eddy current loss measuring sensor prior to the measurement of said conductive film, said distance measuring part measures the distance between said conductive film and said eddy current loss measuring sensor during the scanning prior to the measurement of said conductive film to output the variation in the distance between said conductive film and said eddy current loss measuring sensor, and said thickness operation part corrects the calculated thickness value, during the measurement of the thickness of said conductive film, with reference to the output variation in the distance between said conductive film and said eddy current loss measuring sensor in accordance with a correlation between the variation in the distance between said conductive film and said eddy current loss measuring sensor and the variation in impedance of said eddy current loss measuring part, a correlation between the variation in the distance between said conductive film and said eddy current loss measuring sensor and the variation in current value of said eddy current loss measuring part, or a correlation between the variation in the distance between said conductive film and said eddy current loss measuring sensor and the variation in phase of said eddy current loss measuring part.

47. A thickness measuring system according to claim 46, wherein said eddy current loss measuring sensor includes an exciting/receiving air-cored coil for receiving said high frequency current to excite a high frequency magnetic field to excite an eddy current in said conductive film, and for receiving a synthetic magnetic field of a magnetic field generated by said eddy current and said high frequency magnetic field, to output said high frequency current which is influenced by an eddy current loss caused by said eddy current, and said distance measuring part includes a laser displacement sensor provided above said air-cored coil for emitting a laser beam to cause the laser beam to be incident on the surface of said conductive film via an air-core of said air-cored coil and for receiving light via said air-core, the light being reflected on said conductive film.

* * * * *

UNITED STATES PATENT AND TRADEMARK OFFICE
CERTIFICATE OF CORRECTION

PATENT NO. : 6,563,308 B2
DATED : May 13, 2003
INVENTOR(S) : Nagano et al.

It is certified that error appears in the above-identified patent and that said Letters Patent is hereby corrected as shown below:

Title page,
Item [75], Inventors, "Tokyo-Tu" should read -- Tokyo-To --.

Column 34,
Line 8, after "film which is an" insert -- object --.

Column 35,
Line 46, change "memory for" to -- a memory for --.

Column 36,
Line 21, change "that that of" to -- than that of --.
Line 24, change "eddy current" to -- an eddy current --.

Column 42,
Lines 17-18, change "air cored" to -- air-cored --.

Column 44,
Line 40, change "and the," to -- and the --.

Signed and Sealed this

Twenty-first Day of October, 2003

JAMES E. ROGAN
*Director of the United States Patent and Trademark Office*